US012473385B2

(12) United States Patent
Tsujimoto

(10) Patent No.: US 12,473,385 B2
(45) Date of Patent: Nov. 18, 2025

(54) ULTRAHIGH-MOLECULAR-WEIGHT POLYETHYLENE POWDER AND MOLDED ARTICLE PREPARED BY MOLDING THE SAME

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 665 days.

(21) Appl. No.: 17/913,417

(22) PCT Filed: Mar. 22, 2021

(86) PCT No.: PCT/JP2021/011738
§ 371 (c)(1),
(2) Date: Sep. 21, 2022

(87) PCT Pub. No.: WO2021/193544
PCT Pub. Date: Sep. 30, 2021

(65) Prior Publication Data
US 2024/0002557 A1    Jan. 4, 2024

(30) Foreign Application Priority Data

Mar. 23, 2020   (JP) ................. 2020-051302

(51) Int. Cl.
*C08F 110/02*       (2006.01)
*D01D 5/06*         (2006.01)
*D01F 6/04*         (2006.01)
*H01M 50/417*       (2021.01)

(52) U.S. Cl.
CPC .............. *C08F 110/02* (2013.01); *D01D 5/06* (2013.01); *D01F 6/04* (2013.01); *D10B 2321/0211* (2013.01); *D10B 2401/063* (2013.01); *D10B 2505/00* (2013.01); *H01M 50/417* (2021.01)

(58) Field of Classification Search
None
See application file for complete search history.

(56) References Cited

U.S. PATENT DOCUMENTS

| 2010/0159230 A1 | 6/2010 | Luo et al. |
| 2015/0203605 A1 | 7/2015 | Sinthusai et al. |
| 2019/0177494 A1* | 6/2019 | Tsujimoto ................ C08J 3/005 |
| 2019/0194431 A1 | 6/2019 | Tsujimoto |
| 2021/0017363 A1 | 1/2021 | Tsujimoto |
| 2021/0032446 A1 | 2/2021 | Tanaka |
| 2022/0372258 A1* | 11/2022 | Tanaka ..................... C08F 2/14 |

FOREIGN PATENT DOCUMENTS

| CN | 103342842 A | 10/2013 |
| CN | 109898170 A | 6/2019 |
| CN | 110016727 A | 7/2019 |
| CN | 110637039 A | 12/2019 |
| JP | 2006-225645 A | 8/2006 |
| JP | 2010-216020 A | 9/2010 |
| JP | 2014-040525 A | 3/2014 |
| JP | 2014-055287 A | 3/2014 |
| JP | 2015-131880 A | 7/2015 |
| JP | 2016-035063 A | 3/2016 |
| JP | 2017-088773 A | 5/2017 |
| JP | 2017-137432 A | 8/2017 |
| JP | 2017-145306 A | 8/2017 |
| JP | 2019-048967 A | 3/2019 |
| JP | 6514743 B2 | 5/2019 |
| JP | 2019-099811 A | 6/2019 |
| JP | 2020-180234 A | 11/2020 |
| WO | 2019/187727 A1 | 10/2019 |
| WO | 2019/207991 A1 | 10/2019 |
| WO | 2020/189443 A1 | 9/2020 |

OTHER PUBLICATIONS

Supplementary European Search Report issued in related European Patent Application No. 21776848.0 dated Aug. 8, 2023.
Ermontov et al., "Properties of highly porous aerogels prepared from ultra-high molecular weight polyethylene," Polymer, 182: 121824 (2019).
International Preliminary Report on Patentability and Written Opinion issued in corresponding International Patent Application No. PCT/JP2021/011738 dated Oct. 6, 2022.
International Search Report issued in corresponding International Patent Application No. PCT/JP2021/011738 dated Jun. 1, 2021.

* cited by examiner

*Primary Examiner* — Richard A. Huhn
(74) *Attorney, Agent, or Firm* — Morgan, Lewis & Bockius LLP

(57) ABSTRACT

Provided is an ultrahigh-molecular-weight polyethylene powder having a viscosity-average molecular weight (Mv) of $10 \times 10^4$ or higher and $1000 \times 10^4$ or lower, having a difference of 3° C. or more between a swelling onset temperature and a dissolution onset temperature determined by a specific method, and having a rate of impregnation with liquid paraffin (rate of increase in weight) of 0.5% or more and 5.0% or less determined by a specific method.

20 Claims, No Drawings

ULTRAHIGH-MOLECULAR-WEIGHT POLYETHYLENE POWDER AND MOLDED ARTICLE PREPARED BY MOLDING THE SAME

TECHNICAL FIELD

The present invention relates to an ultrahigh-molecular-weight polyethylene powder and a molded article prepared by molding the same.

BACKGROUND ART

Polyethylene is employed in a wide variety of uses such as films, sheets, microporous membranes, fibers, foams, and pipes. Polyethylene is used because melt processing is easy and the obtained molded article has high mechanical strength and is also excellent in chemical resistance, rigidity, etc. Among others, ultrahigh-molecular-weight polyethylene has higher mechanical strength because of its large molecular weight and is excellent in slidability and abrasion resistance and also excellent in chemical stability and long-term reliability.

However, the ultrahigh-molecular-weight polyethylene has low fluidity even if melted at a temperature equal to or higher than a melting point. Therefore, for example, a compression molding method of compression-molding a polyethylene powder under heating, followed by cutting, or a molding method of dissolving a polyethylene powder in a solvent such as liquid paraffin, then performing drawing, and removing the solvent for molding into a sheet or a thread form.

The ultrahigh-molecular-weight polyethylene is molded in a powder state. The powder has a larger surface area than that of a pellet and has fine pores in the powder.

As for the pore state of the polyethylene powder, for example, Patent Document 1 discloses a polyethylene powder that is rapidly dissolved in a solvent and produces a molded article with less occurrence of undissolved matter, by adjusting a specific surface area determined by a BET method and a pore volume determined by a mercury intrusion method to proper ranges.

For example, Patent Document 2 discloses a polyethylene powder that produces a molded article with less occurrence of undissolved matter, by adjusting the ratio between the median diameter and the modal diameter of pores measured by a mercury intrusion method to a proper range.

List of Prior Art Documents Patent Document
Patent Document 1: Japanese Patent Laid-Open No. 2017-88773
Patent Document 2: Japanese Patent Laid-Open No. 2017-145306

SUMMARY OF INVENTION

Problems to be Solved by Invention

As mentioned above, an ultrahigh-molecular-weight polyethylene powder has a larger surface area than that of a pellet and has fine pores in the powder. Hence, the shape, surface state, crystal state, pore state, and the like of the powder are changed during heating. Therefore, the molding of the ultrahigh-molecular-weight polyethylene powder requires temperature adjustment to a proper temperature and processing such as dissolution or compression. In the case of compression-molding the ultrahigh-molecular-weight polyethylene powder, air bubbles tend to remain in the resulting molded article or strain tends to remain in the resulting molded article and to cause deformation after cooling, unless a preheating temperature before compression is proper.

The polyethylene powder described in Patent Document 1 merely undergoes the adjustment of a specific surface area and a pore volume as powder properties. The properties of the powder are largely changed at an actual dissolution or melting temperature, and this powder is still susceptible to improvement in molding processability.

The polyethylene powder described in Patent Document 2 also merely undergoes the definition of a powder pore size. Since the pore size is largely changed during the course of heating, the powder is still susceptible to improvement in molding processability and may have the difficulty in producing a homogeneous molded article.

The present invention has been made in light of these circumstances. An object of the present invention is to provide an ultrahigh-molecular-weight polyethylene powder excellent in processing moldability, and a molded article (e.g., a microporous membrane, a high-strength fiber, and a porous sintered body) prepared by molding the same, the molded article being excellent in dimension accuracy (having neither wrinkles nor unevenness) and having high strength.

Means for Solving Problems

The present inventor has made earnest studies to solve the above-described problems, and as a result, it has been found that the problems can be solved by adjusting the difference between the swelling onset temperature and the dissolution onset temperature of an ultrahigh-molecular-weight polyethylene powder, and adjusting the rate of impregnation of the ultrahigh-molecular-weight polyethylene powder with liquid paraffin, and thus, the present invention has been accomplished.

Specifically, the present invention is as follows.

[1]

An ultrahigh-molecular-weight polyethylene powder
having a viscosity-average molecular weight (Mv) of $10 \times 10^4$ or higher and $1000 \times 10^4$ or lower,
having a difference of 3° C. or more between a swelling onset temperature and a dissolution onset temperature determined by the following method, and
having a rate of impregnation with liquid paraffin (rate of increase in weight) of 0.5% or more and 5.0% or less determined by the following method:

[method for measuring swelling onset temperature and dissolution onset temperature]

any one particle is collected while an ultrahigh-molecular-weight polyethylene powder having a major axis size and a minor axis size of 120 μm or larger and 130 μm or smaller is confirmed under an optical microscope; the collected one particle of the ultrahigh-molecular-weight polyethylene powder (hereinafter, also referred to as a "measurement particle") is loaded onto a glass cover, and one drop of liquid paraffin is added to the measurement particle using a 2 mL dropper; then, another glass cover is placed thereon so as to sandwich the measurement particle; then, the glass covers with the measurement particle sandwiched therebetween are placed on a heat stage, and a process of heating the measurement particle from room temperature to 150° C. under heating conditions given below is observed under an optical microscope equipped with a camera; in the heating step, observation images of the measurement particle are taken every 6 seconds; after the
completion of measurement, an equivalent circle diameter of the measurement particle is calculated from each
observation image using image analysis software, and
the swelling onset temperature and the dissolution
onset temperature are determined as described below:
(heating conditions)
heating rate from room temperature to 35° C.: 5° C./min;
heating rate in a range from 35° C. to 80° C.: 8° C./min;
and
heating rate in a range from 80° C. to 150° C.: 5° C./min;
[swelling onset temperature]
 the equivalent circle diameter of the measurement
 particle is calculated from the observation image of
 the photographed measurement particle using image
 analysis software; the lowest temperature at which
 the equivalent circle diameter of the measurement
 particle is increased by 1% or more based on the
 equivalent circle diameter of the measurement particle at 80° C. in a temperature range of 80° C. or
 higher and 150° C. or lower is regarded as the
 swelling onset temperature; a mean from three such
 measurements is used as the final swelling onset
 temperature;
[dissolution onset temperature]
 the equivalent circle diameter of the measurement
 particle is calculated from the observation image of
 the photographed measurement particle using image
 analysis software; the measurement temperature at
 which the equivalent circle diameter of the measurement particle exhibits the largest value is regarded as
 the dissolution onset temperature; a mean from three
 such measurements is used as the final dissolution
 onset temperature;
[method for calculating rate of impregnation with liquid
 paraffin (rate of increase in weight)]
 10 g of the ultrahigh-molecular-weight polyethylene
 powder is mixed with 30 g of liquid paraffin to
 prepare a sample; the prepared sample is placed in a
 metal container, which is then covered with aluminum foil and left at 70° C. for 3 hours; next, the
 sample is dried under reduced pressure at 110°
 C./reduced pressure (−0.1 MPa G) for 5 hours; then,
 the sample is subjected three times to washing filtration operation using 10 g of hexane and then dried
 in air for 24 hours or longer, followed by the weight
 measurement of the ultrahigh-molecular-weight
 polyethylene powder; the rate of impregnation with
 liquid paraffin (LP) (rate of increase in weight) is
 calculated from the rate of increase in the weight of
 the ultrahigh-molecular-weight polyethylene powder
 impregnated with liquid paraffin (post-impregnation
 weight) from the original weight of the ultrahigh-molecular-weight polyethylene powder (pre-impregnation weight) according to the following expression:

Rate of impregnation with liquid paraffin (%)=(Post-impregnation weight−Pre-impregnation weight)/Pre-impregnation weight×100.

[2]
The ultrahigh-molecular-weight polyethylene powder according to [1], wherein a specific pore surface area is 0.10 m$^2$/g or larger and 1.50 m$^2$/g or smaller when an ultrahigh-molecular-weight polyethylene powder having a particle size of smaller than 75 μm is measured by a BET method based on krypton adsorption.

[3]
The ultrahigh-molecular-weight polyethylene powder according to [1] or [2], wherein a pore volume is 0.30 mL/g or larger and 1.70 mL/g or smaller when an ultrahigh-molecular-weight polyethylene powder having a particle size of smaller than 75 μm is measured with a mercury porosimeter.

[4]
The ultrahigh-molecular-weight polyethylene powder according to any of [1] to [3], wherein an average pore size is 0.10 μm or larger and 0.80 μm or smaller when an ultrahigh-molecular-weight polyethylene powder having a particle size of smaller than 75 μm is measured with a mercury porosimeter.

[5]
The ultrahigh-molecular-weight polyethylene powder according to any of [1] to [4], wherein a degree of crystallinity is 70% or more and less than 82%.

[6]
The ultrahigh-molecular-weight polyethylene powder according to any of [1] to [5], wherein the proportion of an ultrahigh-molecular-weight polyethylene powder having a particle size of smaller than 75 μm is 35% by mass or less per 100% by mass in total of the ultrahigh-molecular-weight polyethylene powder.

[7]
The ultrahigh-molecular-weight polyethylene powder according to any of [1] to [6], wherein an average particle size (D50) is 60 μm or larger and 140 μm or smaller.

[8]
The ultrahigh-molecular-weight polyethylene powder according to any of [1] to [7], wherein a titanium content is 0.1 ppm or higher and 5 ppm or lower.

[9]
The ultrahigh-molecular-weight polyethylene powder according to any of [1] to [8], wherein an aluminum content is 0.1 ppm or higher and 5 ppm or lower.

A molded article obtained by molding the ultrahigh-molecular-weight polyethylene powder according to any of [1] to [9].

The molded article according to [10], wherein the molded article is a microporous membrane, a high-strength fiber or a sintered body.

Advantages of Invention

The present invention can provide an ultrahigh-molecular-weight polyethylene powder excellent in processing moldability, and a molded article (e.g., a microporous membrane, a high-strength fiber, and a porous sintered body) prepared by molding the same, the molded article being excellent in dimension accuracy (having neither wrinkles nor unevenness) and having high strength.

Mode for Carrying Out Invention

Hereinafter, a mode for carrying out the present invention (hereinafter, also referred to as the "present embodiment") will be described in detail. However, the present invention is not intended to be limited by the present embodiment. Various changes or modifications can be made in the present invention without departing from the spirit thereof.
[Ultrahigh-Molecular-Weight Polyethylene Powder]
The ultrahigh-molecular-weight polyethylene powder (hereinafter, also simply referred to as the "powder") of the present embodiment has a viscosity-average molecular weight of $10 \times 10^4$ or higher and $1000 \times 10^4$ or lower.

The viscosity-average molecular weight of the ultrahigh-molecular-weight polyethylene powder of the present embodiment is preferably in the range of $10 \times 10^4$ or higher and $900 \times 10^4$ or lower, more preferably in the range of $10 \times 10^4$ or higher and $800 \times 10^4$ or lower, from the viewpoint of moldability and final physical properties. In the present embodiment, the viscosity-average molecular weight refers to a value determined by determining an intrinsic viscosity from the specific viscosity of a polymer solution, and converting the intrinsic viscosity to a viscosity-average molecular weight. Specifically, the viscosity-average molecular weight can be determined by a method described in Examples mentioned later.

The ultrahigh-molecular-weight polyethylene powder of the present embodiment is preferably a powder consisting of an ethylene homopolymer and/or a copolymer (hereinafter, also referred to as an ethylene polymer) of ethylene and an olefin (hereinafter, also referred to as a comonomer) copolymerizable therewith.

Specific examples of the olefin copolymerizable with ethylene include, but are not particularly limited to, at least one comonomer selected from the group consisting of α-olefins having 3 or more and 15 or less carbon atoms, cyclic olefins having 3 or more and 15 or less carbon atoms, compounds represented by the formula $CH_2=CHR^1$ (wherein $R^1$ is an aryl group having 6 to 12 carbon atoms), and linear, branched, or cyclic dienes having 3 or more and 15 or less carbon atoms. Among them, an α-olefin having 3 or more and 15 or less carbon atoms is preferred.

Examples of the α-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

When the ethylene polymer for use in the present embodiment comprises a comonomer, the content of the comonomer unit in the ethylene polymer is preferably 0.01% by mol or more and 5% by mol or less, more preferably 0.01% by mol or more and 2% by mol or less, further preferably 0.01% by mol or more and 1% by mol or less. The amount of the comonomer is preferably 5% by mol or less from the viewpoint of reduction in the rate of decomposition.

[Viscosity-Average Molecular Weight]

The viscosity-average molecular weight (Mv) of the ultrahigh-molecular-weight polyethylene powder of the present embodiment is $10 \times 10^4$ or higher and $1000 \times 10^4$ or lower, preferably $10 \times 10^4$ or higher and $900 \times 10^4$ or lower, more preferably $10 \times 10^4$ or higher and $800 \times 10^4$ or lower.

The ultrahigh-molecular-weight polyethylene powder of the present embodiment having a viscosity-average molecular weight (Mv) of $10 \times 10^4$ or higher has further improved strength. The ultrahigh-molecular-weight polyethylene powder of the present embodiment having a viscosity-average molecular weight (Mv) of $1000 \times 10^4$ or lower has further improved moldability.

The viscosity-average molecular weight (Mv) of the ultrahigh-molecular-weight polyethylene powder of the present embodiment for use in a molded article such as microporous membrane is preferably $10 \times 10^4$ or higher and lower than $300 \times 10^4$, more preferably $10 \times 10^4$ or higher and $200 \times 10^4$ or lower. The viscosity-average molecular weight (Mv) of the ultrahigh-molecular-weight polyethylene powder of the present embodiment for use in a molded article such as a high-strength fiber is preferably $300 \times 10^4$ or higher and $1000 \times 10^4$ or lower, more preferably $300 \times 10^4$ or higher and $800 \times 10^4$ or lower.

The method for controlling the viscosity-average molecular weight (Mv) to the range mentioned above is not particularly limited and involves, for example, changing the polymerization temperature of a reactor where ethylene is homopolymerized or ethylene and an olefin copolymerizable therewith is copolymerized. The viscosity-average molecular weight (Mv) tends to be lower as the polymerization temperature is higher, and tends to be higher as the polymerization temperature is lower. Another method for controlling the viscosity-average molecular weight (Mv) to the range mentioned above is not particularly limited and involves, for example, changing the type of an organic metal compound for use as a promoter in the homopolymerization of ethylene or the copolymerization of ethylene and an olefin copolymerizable therewith. A further alternative method for controlling the viscosity-average molecular weight (Mv) to the range mentioned above is not particularly limited and involves, for example, adding a chain transfer agent in the homopolymerization of ethylene or the copolymerization of ethylene and an olefin copolymerizable therewith. The addition of the chain transfer agent tends to decrease the viscosity-average molecular weight of the ultrahigh-molecular-weight polyethylene to be produced even at the same polymerization temperature.

[Swelling Onset Temperature and Dissolution Onset Temperature of Ultrahigh-Molecular-Weight Polyethylene Powder]

The difference between the swelling onset temperature and the dissolution onset temperature of the ultrahigh-molecular-weight polyethylene powder of the present embodiment is 3° C. or more, preferably 4° C. or more, more preferably 5° C. or more, further preferably 7° C. or more. The upper limit of the difference between the swelling onset temperature and the dissolution onset temperature is not particularly limited and is, for example, 50° C. or less, preferably 25° C. or less, more preferably 20° C. or less. The difference between the swelling onset temperature and the dissolution onset temperature is preferably 3° C. or more and 25° C. or less, more preferably 4° C. or more and 20° C. or less, further preferably 5° C. or more and 20° C. or less, particularly preferably 7° C. or more and 20° C. or less. When the difference between the swelling onset temperature and the dissolution onset temperature is 3° C. or more, a sufficient time to impregnate the ultrahigh-molecular-weight polyethylene powder with liquid paraffin can be bought in a molding method of dissolving the powder in the liquid paraffin. Thus, the powder is sufficiently impregnated with the liquid paraffin up to its central part prior to dissolution of the ultrahigh-molecular-weight polyethylene powder at the time of molding processing. Therefore, a homogeneous gel can be obtained without clumps (melted and fused particles of the ultrahigh-molecular-weight polyethylene powder). As a result, the ultrahigh-molecular-weight polyethylene powder of the present embodiment reduces defects (foreign matter (residual clumps in an unmelted state) in a molded article) or the amount of gum at the time of molding processing and can produce a molded article without an uneven thickness. When the difference between the swelling onset temperature and the dissolution onset temperature is 3° C. or more, a homogeneous gel can be obtained even in a shortened kneading time in the kneading of the ultrahigh-molecular-weight polyethylene powder with liquid paraffin using Labo Plastomill, leading to improved productivity. Since a sufficient time to impregnate the ultrahigh-molecular-weight polyethylene powder with liquid paraffin is bought, the molecular chain can be disentangled and the resulting molded article can be a thin-film high-strength article. Thus, the ultrahigh-molecular-weight polyethylene powder of the present embodiment can prepare a homogeneous gel and can also produce a thin-film high-strength molded article by using the gel.

The swelling onset temperature and the dissolution onset temperature are calculated according to the following method.

[Method for Measuring Swelling Onset Temperature and Dissolution Onset Temperature]

Any one particle is collected while an ultrahigh-molecular-weight polyethylene powder having a major axis size and a minor axis size of 120 μm or larger and 130 μm or smaller is confirmed under an optical microscope. The collected one particle of the ultrahigh-molecular-weight polyethylene powder (hereinafter, also referred to as a "measurement particle") is loaded onto a glass cover, and one drop of liquid paraffin is added to the measurement particle using a 2 mL dropper. Then, another glass cover is placed thereon so as to sandwich the measurement particle. Then, the glass covers with the measurement particle sandwiched therebetween are placed on a heat stage, and a process of heating the measurement particle from room temperature to 150° C. under heating conditions given below is observed under an optical microscope equipped with a camera. In the heating step, observation images of the measurement particle are taken every 6 seconds. After the completion of measurement, an equivalent circle diameter of the measurement particle is calculated from each observation image using image analysis software, and the swelling onset temperature and the dissolution onset temperature are determined as described below:

(Heating conditions)
Heating rate from room temperature to 35° C.: 5° C./min
Heating rate in a range from 35° C. to 80° C.: 8° C./min
Heating rate in a range from 80° C. to 150° C.: 5° C./min

[Swelling Onset Temperature]

The equivalent circle diameter of the measurement particle is calculated from the observation image of the photographed measurement particle using image analysis software. The lowest temperature at which the equivalent circle diameter of the measurement particle is increased by 1% or more based on the equivalent circle diameter of the measurement particle at 80° C. in a temperature range of 80° C. or higher and 150° C. or lower is regarded as the swelling onset temperature. A mean from three such measurements is used as the final swelling onset temperature.

[Dissolution Onset Temperature]

The equivalent circle diameter of the measurement particle is calculated from the observation image of the photographed measurement particle using image analysis software. The measurement temperature at which the equivalent circle diameter of the measurement particle exhibits the largest value is regarded as the dissolution onset temperature. A mean from three such measurements is used as the final dissolution onset temperature.

In the present embodiment, the swelling onset temperature and the dissolution onset temperature of the ultrahigh-molecular-weight polyethylene powder can be accurately measured by using a particle of the ultrahigh-molecular-weight polyethylene powder having a major axis size and a minor axis size of 120 μm or larger and 130 μm or smaller as the measurement particle. However, a particle of the ultrahigh-molecular-weight polyethylene powder in the range of an average particle size (D50)±10 μm may be used as the measurement particle for the swelling onset temperature and the dissolution onset temperature in consideration of, for example, the case where the particle of the ultrahigh-molecular-weight polyethylene powder having a major axis size and a minor axis size of 120 μm or larger and 130 μm or smaller is absent. The particle of the ultrahigh-molecular-weight polyethylene powder in the range of an average particle size (D50)±10 μm tends to have a swelling onset temperature and a dissolution onset temperature equivalent to those in the case of using the particle of the ultrahigh-molecular-weight polyethylene powder having a major axis size and a minor axis size of 120 μm or larger and 130 μm or smaller.

[Rate of Impregnation of Ultrahigh-Molecular-Weight Polyethylene Powder with Liquid Paraffin (Rate of Increase in Weight)]

The rate of impregnation with liquid paraffin determined by a method given below (rate of increase in weight; hereinafter, also simply referred to as the "rate of impregnation with liquid paraffin") of the ultrahigh-molecular-weight polyethylene powder of the present embodiment is 0.5% or more and 5.0% or less, preferably 1.0% or more and 4.5% or less, more preferably 2.0% or more and 4.5% or less. When the rate of impregnation with liquid paraffin of the ultrahigh-molecular-weight polyethylene powder of the present embodiment is adjusted to 0.5% or more, the ultrahigh-molecular-weight polyethylene powder is sufficiently impregnated with the liquid paraffin up to its central part. Therefore, a homogeneous gel can be obtained without clumps (melted and fused particles of the ultrahigh-molecular-weight polyethylene powder). As a result, the ultrahigh-molecular-weight polyethylene powder of the present embodiment reduces defects or the amount of gum at the time of molding processing and can produce a molded article without an uneven thickness. When the rate of impregnation with liquid paraffin of the ultrahigh-molecular-weight polyethylene powder of the present embodiment is adjusted to 5.0% or less, a thin-film high-strength molded article can be obtained without wrinkles. This is presumably because the rate of impregnation with liquid paraffin of 5.0% or less in the ultrahigh-molecular-weight polyethylene powder decreases the proportion of an amorphous moiety and facilitates forming a thin-film high-strength article. A low proportion of the amorphous moiety causes dispersion of liquid paraffin, which can favorably disentangle the molecular chain, resulting in a homogeneous gel. Therefore, the degree of drawing is prevented from varying at the time of film formation and drawing. As a result, wrinkles rarely occur, presumably leading to improved membrane strength.

Specifically, by adjusting the rate of impregnation of the powder with liquid paraffin to 5.0% or less, the ultrahigh-molecular-weight polyethylene powder of the present embodiment has the optimized ratio between the crystalline moiety and the amorphous moiety and can consequently produce a thin-film high-strength molded article with fewer wrinkles.

The rate of impregnation of the ultrahigh-molecular-weight polyethylene powder with liquid paraffin is determined according to the following method.

[Method for Calculating Rate of Impregnation with Liquid Paraffin (Rate of Increase in Weight)]

10 g of the ultrahigh-molecular-weight polyethylene powder is mixed with 30 g of liquid paraffin to prepare a sample. The prepared sample is placed in a metal container, which is then covered with aluminum foil and left at 70° C. for 3 hours. Next, the sample is dried under reduced pressure at 110° C./reduced pressure (−0.1 MPa G) for 5 hours. Then, the sample is subjected three times to washing filtration operation using 10 g of hexane and then dried in air for 24 hours or longer, followed by the weight measurement of the ultrahigh-molecular-weight polyethylene powder. The rate of impregnation with liquid paraffin (LP) (rate of increase in weight) is calculated from the rate of increase in the weight of the ultrahigh-molecular-weight polyethylene powder impregnated with liquid paraffin (post-impregnation weight) from the original weight of the ultrahigh-molecular-weight polyethylene powder (pre-impregnation weight) according to the following expression:

Rate of impregnation with liquid paraffin (%)=(Post-impregnation weight−Pre-impregnation weight)/Pre-impregnation weight×100.

[Approach for Achievement]

In the ultrahigh-molecular-weight polyethylene powder of the present embodiment, the method for adjusting the difference between the swelling onset temperature and the dissolution onset temperature to 3° C. or more and the rate of impregnation with liquid paraffin to 0.5% or more and 5.0% or less is not particularly limited and involves, for example, minimizing the difference in pore size and pore volume and the difference in the ratio of the crystalline moiety to the amorphous moiety between the central part and the surface of the ultrahigh-molecular-weight polyethylene powder. The method for producing such an ultrahigh-molecular-weight polyethylene powder is not particularly limited, and a possible method involves, for example, enhancing catalytic activity in the end of polymerization, and adjusting a drying temperature and a drying time.

Specific examples of the method for enhancing catalytic activity in the end of polymerization include, but are not particularly limited to, a method of elevating the internal pressure of a reactor in the end of polymerization, and a method of prolonging a slurry retention time.

The mechanism under which the difference between the swelling onset temperature and the dissolution onset temperature and the rate of impregnation with liquid paraffin can be controlled by such a method is not clear and however, is presumed as follows: a catalyst, when introduced into a system, usually causes vigorous reaction at the initial stage of reaction, and its reaction activity is then reduced. A polymer chain formed at the initial stage of reaction is pushed out from the catalytic center (center of the powder) to the outside. Accordingly, the polymer chain formed at the initial stage of reaction is present on the powder surface. Since the catalytic activity is reduced in the end of reaction, a polymer is slowly formed. Hence, a powder structure (large pores of the powder surface and small pores of the powder central part) and polyethylene physical properties (the ratio of the crystalline moiety to the amorphous moiety) differ between the powder surface and central part. Thus, it is considered that such a structure and physical properties can be adjusted so as to be uniform between the powder central part and surface by elevating the internal pressure of a reactor in the end of polymerization, or prolonging a slurry retention time.

Specific examples of the method for adjusting a drying temperature and a drying time include, but are not particularly limited to, the following drying at 3 stages: the first stage involves spraying a mixed solution of water:methanol=20:80 into a dryer, and while impregnating the ultrahigh-molecular-weight polyethylene powder therewith, drying the powder at a high temperature of crystallization temperature±5° C. for a time corresponding to ¼ of the total drying time; the second stage involves drying the powder at a temperature of 90° C. or higher and 105° C. or lower for a time corresponding to ⅔ of the total drying time; and the third stage involves drying the powder at a temperature of 60° C. or higher and lower than 90° C. for a time corresponding to ¼ of the total drying time. It is considered that: under such drying conditions, methanol and water are volatilized in this order so that the pore size and the pore volume can be adjusted for the central part and the surface of the polyethylene powder; and by gradually lowering the temperature and performing drying for a given time, the annealing of the polyethylene powder can be prevented so that the ratio of the crystalline moiety to the amorphous moiety can be adjusted for the central part and the surface of the polyethylene powder.

[Specific Pore Surface Area in BET (Kr) Measurement of Ultrahigh-Molecular-Weight Polyethylene Powder Having Particle Size of Smaller than 75 μm]

The specific pore surface area of the ultrahigh-molecular-weight polyethylene powder of the present embodiment is preferably 0.10 $m^2$/g or larger and 1.50 m 2/g or smaller, more preferably 0.10 $m^2$/g or larger and 1.40 $m^2$/g or smaller, further preferably 0.20 $m^2$/g or larger and 1.20 $m^2$/g or smaller when an ultrahigh-molecular-weight polyethylene powder having a particle size of smaller than 75 μm is measured by a BET method based on krypton adsorption (hereinafter, also referred to as "BET (Kr)"). When the specific pore surface area is 0.10 $m^2$/g or larger in the BET (Kr) measurement of an ultrahigh-molecular-weight polyethylene powder having a particle size of smaller than 75 μm, the powder is sufficiently impregnated with the liquid paraffin up to its central part prior to dissolution of the ultrahigh-molecular-weight polyethylene powder at the time of molding processing. Therefore, a homogeneous gel tends to be able to be obtained without clumps (melted and fused particles of the ultrahigh-molecular-weight polyethylene powder). As a result, the ultrahigh-molecular-weight polyethylene powder of the present embodiment reduces defects or the amount of gum at the time of molding processing and tends to be able to produce a molded article without an uneven thickness. A homogeneous gel can be obtained even in a shortened kneading time in the kneading of the ultrahigh-molecular-weight polyethylene powder of the present embodiment with liquid paraffin using Labo Plastomill. Since the ultrahigh-molecular-weight polyethylene powder is sufficiently impregnated with liquid paraffin, the molecular chain can be disentangled in a short time and the resulting molded article tends to be able to be a thin-film high-strength article.

When the specific pore surface area is 1.50 $m^2$/g or smaller in the BET (Kr) measurement of an ultrahigh-molecular-weight polyethylene powder having a particle size of smaller than 75 μm, the ultrahigh-molecular-weight polyethylene powder of the present embodiment can have the optimized ratio between the crystalline moiety and the amorphous moiety which influences the obtainment of a high-strength molded article. Specifically, when the specific pore surface area is 1.50 $m^2$/g or smaller, the proportion of the amorphous moiety is decreased because of a dense powder with a small number of pores. It is thus considered that strength tends to be improved.

In the present embodiment, the method for controlling the specific pore surface area to the range described above in the BET (Kr) measurement of an ultrahigh-molecular-weight polyethylene powder having a particle size of smaller than 75 μm is not particularly limited, and a possible method involves, for example, enhancing catalytic activity in the end of polymerization, and adjusting a drying temperature and a drying time.

Specific examples of the method for enhancing catalytic activity in the end of polymerization include, but are not particularly limited to, a method of elevating the internal pressure of a reactor in the end of polymerization, and a method of prolonging a slurry retention time.

[Pore Volume in Mercury Porosimeter Measurement of Ultrahigh-Molecular-Weight Polyethylene Powder Having Particle Size of Smaller than 75 μm]

The ultrahigh-molecular-weight polyethylene powder of the present embodiment has a pore volume of preferably 0.30 mL/g or larger and 1.70 mL/g or smaller, more preferably 0.30 mL/g or larger and 1.30 mL/g or smaller, further preferably 0.40 mL/g or larger and 1.20 mL/g or smaller, particularly preferably 0.50 mL/g or larger and 1.00 mL/g or smaller when an ultrahigh-molecular-weight polyethylene powder having a particle size of smaller than 75 μm is measured with a mercury porosimeter. When the pore volume is 0.30 mL/g or larger in the mercury porosimeter measurement of an ultrahigh-molecular-weight polyethylene powder having a particle size of smaller than 75 μm, the ultrahigh-molecular-weight polyethylene powder of the present embodiment is sufficiently impregnated with the liquid paraffin up to its central part prior to dissolution of the ultrahigh-molecular-weight polyethylene powder at the time of molding processing. Therefore, a homogeneous gel can be obtained without clumps (melted and fused particles of the ultrahigh-molecular-weight polyethylene powder). As a result, the ultrahigh-molecular-weight polyethylene powder reduces defects or the amount of gum at the time of molding processing and tends to be able to produce a molded article without an uneven thickness. A homogeneous gel can be obtained even in a shortened kneading time in the kneading of the ultrahigh-molecular-weight polyethylene powder of the present embodiment with liquid paraffin using Labo Plastomill. Since the ultrahigh-molecular-weight polyethylene powder is sufficiently impregnated with liquid paraffin, the molecular chain can be disentangled in a short time and the resulting molded article tends to be able to be a thin-film high-strength article.

When the pore volume is 1.70 mL/g or smaller in the mercury porosimeter measurement of an ultrahigh-molecular-weight polyethylene powder having a particle size of smaller than 75 μm, the ultrahigh-molecular-weight polyethylene powder of the present embodiment can have the optimized ratio between the crystalline moiety and the amorphous moiety which influences the obtainment of a high-strength molded article. Specifically, when the pore volume is 1.70 mL/g or smaller, the proportion of the amorphous moiety is decreased because of a dense powder with a small number of pores. It is thus considered that strength tends to be improved.

In the present embodiment, the method for controlling the pore volume to the range described above in the mercury porosimeter measurement of an ultrahigh-molecular-weight polyethylene powder having a particle size of smaller than 75 μm is not particularly limited, and a possible method involves, for example, enhancing catalytic activity in the end of polymerization, and adjusting a drying temperature and a drying time.

Specific examples of the method for enhancing catalytic activity in the end of polymerization include, but are not particularly limited to, a method of elevating the internal pressure of a reactor in the end of polymerization, and a method of prolonging a slurry retention time.

[Average Pore Size in Mercury Porosimeter Measurement of Ultrahigh-Molecular-Weight Polyethylene Powder Having Particle Size of Smaller than 75 μm]

The ultrahigh-molecular-weight polyethylene powder of the present embodiment has an average pore size of preferably 0.10 μm or larger and 0.80 μm or smaller, more preferably 0.10 μm or larger and 0.50 μm or smaller, further preferably 0.10 μm or larger and 0.45 μm or smaller, particularly preferably 0.20 μm or larger and 0.40 μm or smaller when an ultrahigh-molecular-weight polyethylene powder having a particle size of smaller than 75 μm is measured with a mercury porosimeter. When the average pore size is 0.10 μm or larger in the mercury porosimeter measurement of an ultrahigh-molecular-weight polyethylene powder having a particle size of smaller than 75 μm, the ultrahigh-molecular-weight polyethylene powder of the present embodiment is sufficiently impregnated with the liquid paraffin up to its central part prior to dissolution of the ultrahigh-molecular-weight polyethylene powder at the time of molding processing. Therefore, a homogeneous gel can be obtained without clumps (melted and fused particles of the ultrahigh-molecular-weight polyethylene powder). As a result, the ultrahigh-molecular-weight polyethylene powder reduces defects or the amount of gum at the time of molding processing and tends to be able to produce a molded article without an uneven thickness. A homogeneous gel can be obtained even in a shortened kneading time in the kneading of the ultrahigh-molecular-weight polyethylene powder of the present embodiment with liquid paraffin using Labo Plastomill. Since the ultrahigh-molecular-weight polyethylene powder is sufficiently impregnated with liquid paraffin, the molecular chain can be disentangled in a short time and the resulting molded article tends to be able to be a thin-film high-strength article.

When the average pore size is 0.80 μm or smaller in the mercury porosimeter measurement of an ultrahigh-molecular-weight polyethylene powder having a particle size of smaller than 75 μm, the ultrahigh-molecular-weight polyethylene powder of the present embodiment can have the optimized ratio between the crystalline moiety and the amorphous moiety which influences the obtainment of a high-strength molded article. Specifically, when the average pore size is 0.80 μm or smaller, the proportion of the amorphous moiety is decreased because of a dense powder with a small number of pores. It is thus considered that strength tends to be improved.

In the present embodiment, the method for controlling the average pore size to the range described above in the mercury porosimeter measurement of an ultrahigh-molecular-weight polyethylene powder having a particle size of smaller than 75 μm is not particularly limited, and a possible method involves, for example, enhancing catalytic activity in the end of polymerization, and adjusting a drying temperature and a drying time.

Specific examples of the method for enhancing catalytic activity in the end of polymerization include, but are not particularly limited to, a method of elevating the internal pressure of a reactor in the end of polymerization, and a method of prolonging a slurry retention time.

[Degree of Crystallinity of Ultrahigh-Molecular-Weight Polyethylene Powder]

The degree of crystallinity of the ultrahigh-molecular-weight polyethylene powder of the present embodiment is preferably 70% or more and 82% or less, more preferably 70% or more and 80% or less, further preferably 70% or more and 78% or less, particularly preferably 70% or more and 75% or less. When the degree of crystallinity is 70% or more, the ultrahigh-molecular-weight polyethylene powder of the present embodiment tends to be able to produce a high-strength molded article. When the degree of crystallinity is 82% or less, the ultrahigh-molecular-weight polyethylene powder of the present embodiment tends to be easy to process by molding and be excellent in processability.

In the present embodiment, the method for controlling the degree of crystallinity of the ultrahigh-molecular-weight polyethylene powder to the range described above is not particularly limited, and a possible method involves, for example, adjusting a drying temperature and a drying time.

In the present embodiment, the degree of crystallinity can be measured by a method described in Examples mentioned later.

[Proportion of Ultrahigh-Molecular-Weight Polyethylene Powder Having Particle Size of Smaller than 75 μm]

In the ultrahigh-molecular-weight polyethylene powder of the present embodiment, the proportion of an ultrahigh-molecular-weight polyethylene powder having a particle size of lower than 75 μm is preferably 35% by mass or less, more preferably 33% by mass or less, further preferably 30% by mass or less, per 100% by mass in total of the ultrahigh-molecular-weight polyethylene powder. The lower limit of the proportion of the ultrahigh-molecular-weight polyethylene powder having a particle size of lower than 75 μm is not particularly limited and is, for example, 1% by mass per 100% by mass in total of the ultrahigh-molecular-weight polyethylene powder. When the proportion of the ultrahigh-molecular-weight polyethylene powder having a particle size of lower than 75 μm is 35% by mass or less, the ultrahigh-molecular-weight polyethylene powder of the present embodiment can produce a homogeneous gel without clumps. Specifically, when the proportion of the ultrahigh-molecular-weight polyethylene powder having a particle size of lower than 75 μm is 35% by mass or less, the melt fusion of a fine powder can be suppressed prior to swelling of the ultrahigh-molecular-weight polyethylene powder and clumping rarely occurs. Thus, by adjusting the proportion of the ultrahigh-molecular-weight polyethylene powder having a particle size of lower than 75 μm to 35% by mass or less, the ultrahigh-molecular-weight polyethylene powder of the present embodiment reduces defects or the amount of gum at the time of molding processing and tends to be able to produce a molded article without an uneven thickness.

In the present embodiment, the proportion of the ultrahigh-molecular-weight polyethylene powder having a particle size of lower than 75 μm can be measured by a method described in Examples mentioned later.

[Average Particle Size (D50) of Ultrahigh-Molecular-Weight Polyethylene Powder]

The average particle size (D50) of the ultrahigh-molecular-weight polyethylene powder of the present embodiment is preferably 60 μm or larger and 140 μm or smaller, more preferably 60 μm or larger and 120 μm or smaller, further preferably 60 μm or larger and 115 μm or smaller, particularly preferably 60 μm or larger and 100 μm or smaller. When the average particle size (D50) is 60 μm or larger, the melt fusion and clumping of a fine powder of the ultrahigh-molecular-weight polyethylene powder of the present embodiment can be suppressed prior to swelling of the ultrahigh-molecular-weight polyethylene powder. As a result, the ultrahigh-molecular-weight polyethylene powder of the present embodiment reduces defects or the amount of gum at the time of molding processing and tends to be able to produce a molded article without an uneven thickness. When the average particle size (D50) is 140 μm or smaller, the poor swelling of a coarse powder can be suppressed in the ultrahigh-molecular-weight polyethylene powder of the present embodiment. As a result, the ultrahigh-molecular-weight polyethylene powder of the present embodiment reduces defects or the amount of gum at the time of molding processing and tends to be able to produce a molded article without an uneven thickness.

In the present embodiment, the average particle size (D50) of the ultrahigh-molecular-weight polyethylene powder can be measured by a method described in Examples mentioned later.

[Titanium Content and Aluminum Content in Ultrahigh-Molecular-Weight Polyethylene Powder]

The titanium (Ti) content of the ultrahigh-molecular-weight polyethylene powder of the present embodiment is preferably 0.1 ppm or higher and 5.0 ppm or lower, more preferably 0.5 ppm or higher and 5.0 ppm or lower, further preferably 1.0 ppm or higher and 4.0 ppm or lower. The aluminum (Al) content of the ultrahigh-molecular-weight polyethylene powder of the present embodiment is preferably 0.1 ppm or higher and 5.0 ppm or lower, more preferably 0.1 ppm or higher and 4.0 ppm or lower, further preferably 0.1 ppm or higher and 3.5 ppm or lower.

The ultrahigh-molecular-weight polyethylene powder of the present embodiment having the titanium content and the aluminum content thus adjusted to the ranges has better thermal stability and tends to produce a molded article having better long-term stability. Such an ultrahigh-molecular-weight polyethylene powder can be prevented from reacting with an antioxidant or a heat stabilizer to be added for processing, and thus tends to be able to suppress the coloration of a molded article ascribable to the formation of an organic metal complex. Furthermore, a fiber prepared from the ultrahigh-molecular-weight polyethylene powder of the present embodiment having the titanium content and the aluminum content adjusted to the ranges described above can produce a thread having a uniform thread diameter, and a membrane prepared therefrom can have a uniform film thickness. In general, large amounts of metals derived from catalyst residues remaining in an ultrahigh-molecular-weight polyethylene powder have a strong tendency to cause an uneven thickness of a molded article. The contents of Ti and Al in the ultrahigh-molecular-weight polyethylene powder can be controlled by the productivity of an ethylene homopolymer or an ethylene polymer per unit catalyst. The productivity of an ethylene homopolymer or an ethylene polymer can be controlled by a polymerization temperature, a polymerization pressure, or a slurry concentration in a reactor for production. Specifically, examples of the approach of enhancing the productivity of the ethylene homopolymer or the ethylene polymer for use in the present embodiment include, but are not particularly limited to, elevation of a polymerization temperature, elevation of a polymerization pressure, and/or elevation of a slurry concentration. In other methods, the amount of aluminum may be controlled by selecting the type of a promoter component, decreasing the concentration of the promoter component, or washing the ethylene homopolymer or the ethylene polymer with an acid or an alkali in polymerization for the ethylene homopolymer or the ethylene polymer. In the present embodiment, the contents of Ti and Al can be measured by a method described in Examples mentioned later.

[Method for Producing Ultrahigh-Molecular-Weight Polyethylene Powder]

(Catalytic Component)

Example of the catalytic component for use in the production of the ultrahigh-molecular-weight polyethylene powder according to the present embodiment includes, but is not particularly limited to, general Ziegler-Natta catalysts.

<Ziegler-Natta Catalyst>

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the following formula 1 which is soluble in an inert hydrocarbon solvent with a titanium compound (A-2) represented by the following formula 2:

$$(A\text{-}1): (M^1)_\alpha(Mg)_\beta(R^2)_a(R^3)_b(Y^1)_c \quad \text{Formula 1}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha + 2\beta = a+b+c$ (wherein n represents the valence of $M^1$); and $$(A\text{-}2): Ti(OR^7)_d X^1_{(4-d)} \quad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression $n\alpha + 2\beta = a+b+c$ of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in the formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting, for example, an organic magnesium compound selected from the group consisting of the formulas $R^2MgX^1$ and $R^2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of M") at 25° C. or higher and 150° C. or lower in an inert hydrocarbon solvent and, if necessary, subsequently with a compound represented by the formula $Y^1$-H (wherein Y" is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$-H, the order in which the compounds are added to the reaction system is not particularly limited. Any of the following methods can be used: for example, the compound represented by the formula $Y^1$-H is added into the organic magnesium compound; the organic magnesium compound is added into the compound represented by the formula $Y^1$-H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

(A-2): $Ti(OR^7)_dX^1_{(4-d)}$  Formula 2 wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, further preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is particularly preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and further preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, further preferably within the range of −40° C. or higher and 100° C. or lower. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

(C-1): $(M^2)_\gamma(Mg)_\delta(R^8)_e(R^9)_f(OR^{10})_g$ 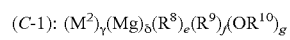 Formula 3 wherein $M^2$ represents a metal atom selected from the group consisting of groups 12, 13, and 14 of the periodic system; $R^8$, $R^9$, and $R^{10}$ each represent a hydrocarbon group having 1 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma+2\delta=e+f+g$ (wherein k represents the valence of $M^2$);

(C-2): $H_hSiCl_lR^{11}_{(4-(h+i))}$  Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

(C-4): $(M^1)_\alpha(Mg)_\beta(R^2)_a(R^3)_bY^1_c$ 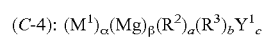 Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N═C—$R^4$, $R^5$, —$SR^6$ (wherein $R^4$, $R^5$, and $R^6$ each represent a hydrocarbon group having 1 or more and 20 or less carbon atoms, and when c is 2, Y" moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha+2\beta=a+b+c$ (wherein n represents the valence of $M^1$); and (C-5): $Ti(OR^7)_dX^1_{(4-d)}$  Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression $k\gamma+2\delta=e+f+g$ of the symbols $\gamma$, $\delta$, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When $\gamma>0$, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio $\delta/\gamma$ of magnesium to the metal atom $M^2$ is not particularly limited and is preferably 0.1 or more and 30 or less, further preferably 0.5 or more and 10 or less. In the case of using a predetermined organic magnesium compound wherein $\gamma=0$, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in the formula 3 wherein $\gamma=0$.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms;

Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas $R^8MgX^1$ and $R^8Mg$ (wherein $R^8$ is as defined above, and $X^1$ represents a halogen atom) with an organic metal compound selected from the group consisting of the formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0 \leq g/(\gamma+\delta) \leq 2$, preferably $0 \leq g/(\gamma+\delta) < 1$.

Next, the compound (C-2) will be described. The compound (C-2) is a silicon chloride compound having at least one Si—H bond, represented by the formula 4:

(C-2): $H_hSiCl_iR^{11}{}_{(4-(h+i))}$  Formula 4 wherein $R^{11}$ represents s hydrocarbon group having 1 or more and 12 or less carbon atoms; and h and i each represent a real number that satisfies the following relationships: $0<h$, $0<i$, and $0<h+i \leq 4$.

In the formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 or more and 3 or less carbon atoms, such as methyl, ethyl, propyl, and 1-methylethyl group are further preferred. Each of h and i is a number larger than 0 that satisfies the relationship h+i≤4. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2$ $(C_3H_7)$ $HSiCl_2(2-C_3H_7)$, $HSiCl_2$ $(C_4H_9)$, $HSiCl_2(C_6H_5)$, $HSiCl_2(4-Cl-C_6H_4)$, $HSiCl_2$ $(CH=CH_2)$ $HSiCl_2(CH_2C_6H_5)$, $HSiCl_2(1-C_{10}H_7)$, $HSiCl_2(CH_2CH=CH_2)$ $H_2SiCl(CH_3)$, $H_2SiCl(C_2H_5)$, $HSiCl(CH_3)_2$, $HSiCl(C_2H_5)_2$, $HSiCl(CH_3)$ $(2-C_3H_7)$, $HSiCl$ $(CH_3)$ $(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, further preferably 0.1 mol or higher and 10 mol or lower, of silicon atom contained in the compound (C-2) per 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by the formula 5:

$$(C\text{-}4): (M^1)_\alpha(Mg)_\beta(R^2)_a(R^3)_b Y^1_c \qquad \text{Formula 5}$$

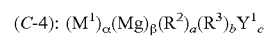

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, $-N=C-R^4$, $R^5$, $-SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0<a+b, 0≤c/(α+β)≤2, and nα+2β=a+b+c (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 6:

$$(C\text{-}5)\text{Ti}(OR^7)_d X^1_{(4-d)} \qquad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In the formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, further preferably within the range of −40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) and/or using a third component to efficiently support the compound (C-5). A method of achieving this supporting through the reaction between the compound (C-5) and the organic magnesium compound (C-4) is preferred.

Next, the organic metal compound component [B] for use in the present embodiment will be described. The solid catalytic component for use in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

$$AlR^{12}_j Z^1_{(3-j)} \qquad \text{Formula 7}$$

wherein $R^{12}$ represents a hydrocarbon group having 1 or more and 20 or less carbon atoms; Z 1 represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by $R^{12}$ include, but are not particularly limited to, aliphatic hydrocarbon groups, aromatic hydrocarbon groups, and alicyclic hydrocarbon groups, for example, trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent:

$$(M^2)_\gamma(Mg)_\delta(R^8)_e(R^9)_f(OR^{10})_g \qquad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 1 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e+f+g$ (wherein k represents the valence of $M^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 or more and 10 or less, more preferably a compound wherein $M^2$ is aluminum, because a compound having higher solubility in an inert hydrocarbon solvent is more preferred.

The ratio between the solid catalytic component and the organic metal compound component [B] to be combined is not particularly limited and is preferably 1 mmol or higher and 3,000 mmol or lower of the organic metal compound component [B] per g of the solid catalytic component.

(Polymerization Conditions)

In the method for producing the ultrahigh-molecular-weight polyethylene powder of the present embodiment, the polymerization temperature is usually 30° C. or higher and 100° C. or lower. The polymerization temperature equal to or higher than 30° C. tends to realize efficient industrial production. On the other hand, the polymerization temperature equal to or lower than 100° C. tends to realize continuous stable operation.

In the method for producing the ultrahigh-molecular-weight polyethylene powder of the present embodiment, the polymerization pressure is usually atmospheric pressure or higher and 2 MPa or lower. The polymerization pressure is preferably 0.1 MPa or higher, more preferably 0.12 MPa or higher and preferably 1.5 MPa or lower, more preferably 1.0 MPa or lower. The polymerization pressure equal to or higher than atmospheric pressure tends to realize efficient industrial production. The polymerization pressure equal to or lower than 2 MPa tends to be able to suppress partial heat generation ascribable to rapid polymerization reaction during the introduction of a catalyst, and realize stable production of the polyethylene.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced polyethylene. Thus, the polymerization system is further stabilized. Ethylene reaction in a homogeneous state in the system prevents the formation of branches and/or double bonds or the like in polymer chains and is less likely to cause reduction in molecular weight and/or cross-linking of the polyethylene.

The resulting ultrahigh-molecular-weight polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred.

Alternatively, the polymerization may be carried out at two or more stages differing in reaction conditions. The intrinsic viscosity of the resulting polyethylene can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in production of the polyethylene can be included.

For the polymerization for the ultrahigh-molecular-weight polyethylene powder of the present embodiment, an antistatic agent such as Stadis 450 manufactured by The Associated Octel Company Ltd. (agent: Maruwa Bussan K. K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, based on the amount of the polyethylene produced per unit time.

In the method for producing the ultrahigh-molecular-weight polyethylene powder of the present embodiment, it is preferred to elevate the internal pressure of a reactor in the end of polymerization and to increase the amount of ethylene introduced.

A catalyst, when introduced into a system, usually causes vigorous reaction at the initial stage of reaction, and its reaction activity is then reduced. A polymer chain formed at the initial stage of reaction is pushed out from the catalytic center (center of the powder) to the outside. Accordingly, the polymer chain formed at the initial stage of reaction is present on the powder surface. Since the catalytic activity is reduced in the end of reaction, a polymer is slowly formed. Hence, a powder structure (large pores of the powder surface and small pores of the powder central part) and polyethylene physical properties (the ratio of the crystalline moiety to the amorphous moiety) differ between the powder surface and central part. Thus, it is considered that both the pores of the powder central part and surface can be adjusted so as to be large by elevating the internal pressure of a reactor in the end of polymerization, or increasing the amount of ethylene introduced.

It is also preferred to appropriately adjust a drying temperature and a drying time. Specifically, the following drying at 3 stages is preferred: the first stage preferably involves spraying a mixed solution of water:methanol=20:80 into a dryer, and while impregnating the ultrahigh-molecular-weight polyethylene powder therewith, drying the powder at a high temperature of crystallization temperature±5° C. for a time corresponding to ¼ of the total drying time; the second stage preferably involves drying the powder at a temperature of 90° C. or higher and 105° C. or lower for a time corresponding to ⅔ of the total drying time; and the third stage preferably involves drying the powder at a temperature of 60° C. or higher and lower than 90° C. for a time corresponding to ¼ of the total drying time. Methanol and water can be volatilized in this order at the first stage so that the pore size and the pore volume can be adjusted for the central part and the surface of the ultrahigh-molecular-weight polyethylene powder. Continuous drying at a high temperature anneals the ultrahigh-molecular-weight polyethylene powder and throws the central part and surface pore sizes and pore volumes of the ultrahigh-molecular-weight polyethylene powder out of balance. Therefore, the drying time of the first stage is preferably a time corresponding to ¼ of the total drying time, and the temperature is preferably lowered at the second or later stage. However, sudden decrease to a low temperature throws the ratio between the crystalline moiety and the amorphous moiety out of balance for the central part and the surface of the ultrahigh-molecular-weight polyethylene powder.

Therefore, drying is preferably performed for a time corresponding to ⅔ of the total drying time at an intermediate temperature, as in the second stage, and performed at a low temperature at the third stage.

In this way, each polymerization condition can be adjusted to obtain the ultrahigh-molecular-weight polyethylene powder of the present embodiment.

[Additive]

The ultrahigh-molecular-weight polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The content of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound, specifically include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene (3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f] [1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite).

In the ultrahigh-molecular-weight polyethylene powder according to the present embodiment, the amount of the antioxidant is preferably 5 parts by mass or lower, more preferably 4 parts by mass or lower, further preferably 3 parts by mass or lower, particularly preferably 2 parts by mass or lower, based on 100 parts by mass in total of the ultrahigh-molecular-weight polyethylene powder and the liquid paraffin. The ultrahigh-molecular-weight polyethylene powder containing 5 parts by mass or lower of the antioxidant is less susceptible to embrittlement and/or discoloration, reduction in mechanical properties, etc., because of the suppressed degradation thereof, resulting in better long-term stability.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

[Molded Article]

The ultrahigh-molecular-weight polyethylene powder of the present embodiment can be molded by various methods. The molded article of the present embodiment is obtained by molding the ultrahigh-molecular-weight polyethylene powder mentioned above. The molded article of the present embodiment can be employed in various uses. Specific examples of the molded article of the present embodiment are not limited, and the molded article is suitable as, for example, a microporous membrane for a secondary battery separator, particularly, a microporous membrane for a lithium ion secondary battery separator, a sintered body, or a high-strength fiber. Examples of the method for producing the microporous membrane include, but are not particularly limited to, a processing method based on a wet process using a solvent, which involves extrusion in an extruder equipped with a T die, drawing, extraction, and drying.

The molded article can also be used as a molded article (sintered body) obtained by sintering the ultrahigh-molecular-weight polyethylene powder mentioned above by exploiting excellent features such as abrasion resistance, high slidability, high strength, and high impact resistance, which are the properties of the high-molecular-weight ethylene polymer.

Examples of the method for producing the high-strength fiber include, but are not particularly limited to, a method which involves kneading and spinning liquid paraffin and the ultrahigh-molecular-weight polyethylene powder mentioned above, followed by heating and drawing to obtain the high-strength fiber.

EXAMPLES

Hereinafter, the present invention will be described more specifically with reference to Examples and Comparative Examples. However, the present invention is not intended to be limited by Examples below by any means.

In the present application, ethylene and hexane used in Examples and Comparative Examples were dehydrated using MS-3A (manufactured by UNION SHOWA K.K.). The hexane was used after being further deoxidated by deaeration under reduced pressure using a vacuum pump.

[Methods and Conditions for Measuring]

The physical properties of ultrahigh-molecular-weight polyethylene powders of Examples and Comparative Examples were measured by the following methods.

(1) Viscosity-Average Molecular Weight (Mv)

The viscosity-average molecular weight Mv of each ultrahigh-molecular-weight polyethylene powder obtained in Examples and Comparative Examples was determined by the following method in accordance with ISO1628-3 (2010).

First, 20 mg of the ultrahigh-molecular-weight polyethylene powder was weighed into a dissolution tube. After purging with the dissolution tube with nitrogen, 20 mL of decahydronaphthalene (supplemented with 1 g/L of 2,6-di-t-butyl-4-methylphenol) was added thereto. The ultrahigh-molecular-weight polyethylene powder was dissolved by stirring at 150° C. for 2 hours. The falling time (ts) between gauges of the solution was measured in a thermostat bath of 135° C. using a Cannon-Fenske viscometer (manufactured by Sibata Scientific Technology Ltd.; product No. 100). The falling time (ts) between gauges of a sample containing the ultrahigh-molecular-weight polyethylene powder in an amount changed to 10 mg, 5 mg, or 2 mg was measured in the same way as above. The falling time (tb) of decahydronaphthalene alone was measured as a blank without the addition of the ultrahigh-molecular-weight polyethylene powder. The reduced viscosity ($\eta sp/C$) of the ultrahigh-molecular-weight polyethylene powder was determined according to the following expression.

$$\eta sp/C = (ts/tb - 1)/0.1 \text{(unit: dL/g)}$$

The relationship between the concentration (C) (unit: g/dL) and the reduced viscosity ($\eta sp/C$) of each ultrahigh-molecular-weight polyethylene powder was plotted, and a linear approximation formula was obtained by the least square method. The intrinsic viscosity ($[\eta]$) was determined by extrapolation to the concentration 0. Next, the viscosity-average molecular weight (Mv) was calculated from the value of the intrinsic viscosity ($[11]$) according to the following mathematical expression A.

$$Mv = (5.34 \times 10^4) \times [\eta]^{1.49} \quad \text{(Mathematical expression A)}$$

(2) Swelling Onset Temperature and Dissolution Onset Temperature

Any one particle was collected while an ultrahigh-molecular-weight polyethylene powder having a major axis size and a minor axis size of 120 μm or larger and 130 μm or smaller was confirmed under an optical microscope. The collected one particle of the ultrahigh-molecular-weight polyethylene powder (hereinafter, also referred to as a "measurement particle") was loaded onto a glass cover (Paul Marienfeld GmbH & Co. KG, Deckglaser Cover Glasses 24×24 mm), and one drop of liquid paraffin (liquid paraffin (product name: Smoil P-350P) manufactured by MORESCO Corp.) was added to the measurement particle using a 2 mL dropper. Then, another glass cover (Matsunami Glass Ind., Ltd., TROPHY MICRO COVER GLASS 18×18 mm) was placed thereon so as to sandwich the measurement particle. Then, the glass covers with the measurement particle sandwiched therebetween were placed on a heat stage, and a process of heating the measurement particle from room temperature to 150° C. under heating conditions given below was observed under an optical microscope equipped with a camera. In the heating step, observation images of the measurement particle were taken every 6 seconds. After the completion of measurement, an equivalent circle diameter of the measurement particle was calculated from each observation image using image analysis software (A-Zou-Kun ver. 2.50 manufactured by Asahi Kasei Corp.), and the swelling onset temperature and the dissolution onset temperature were determined as described below:

(Heating conditions)

Heating rate in a range from 35° C. to 80° C.: 8° C./min

Heating rate in a range from 80° C. to 150° C.: 5° C./min

A heating rate from room temperature to 35° C. was set to 5° C./min.

[Swelling Onset Temperature]

The equivalent circle diameter of the measurement particle was calculated from the observation image of the photographed measurement particle using image analysis software (A-Zou-Kun ver. 2.50 manufactured by Asahi Kasei Corp.). The lowest temperature at which the equivalent circle diameter of the measurement particle was increased by 1% or more based on the equivalent circle diameter of the measurement particle at 80° C. in a temperature range of 80° C. or higher and 150° C. or lower was regarded as the swelling onset temperature. A mean from three such measurements was used as the final swelling onset temperature. The equivalent circle diameter of the measurement particle was plotted against each temperature to prepare a graph.

[Dissolution Onset Temperature]

The equivalent circle diameter of the measurement particle was calculated from the observation image of the photographed measurement particle using image analysis software. The measurement temperature at which the equivalent circle diameter of the measurement particle exhibited the largest value was regarded as the dissolution onset temperature. A mean from three such measurements was used as the final dissolution onset temperature.

(3) Rate of Impregnation with Liquid Paraffin (Rate of Increase in Weight)

10 g of an ultrahigh-molecular-weight polyethylene powder was mixed with 30 g of liquid paraffin (liquid paraffin (product name: Smoil P-350P) manufactured by MORESCO Corp.) under conditions involving a stirring speed of 50 rpm and 3 min to prepare a sample. The prepared sample was placed in a metal container, which was then covered with aluminum foil and left at 70° C. for 3 hours. Next, the sample was dried under reduced pressure at 110° C./reduced pressure (−0.1 MPa G) for 5 hours. Then, the sample was subjected three times to washing filtration operation using 10 g of hexane and then dried in air for 24 hours or longer, followed by the weight measurement of the ultrahigh-molecular-weight polyethylene powder. The washing filtration operation refers to an operation of loading a filter paper in a funnel, pouring the sample onto the filter paper, and further pouring 10 g of hexane thereonto to perform washing filtration. The rate of impregnation with liquid paraffin (LP) (rate of increase in weight) was calculated from the rate of increase in the weight of the ultrahigh-molecular-weight polyethylene powder impregnated with liquid paraffin (post-impregnation weight) from the original weight of the ultrahigh-molecular-weight polyethylene powder (pre-impregnation weight) according to the following expression:

Rate of impregnation with liquid paraffin (%)=(Post-impregnation weight−Pre-impregnation weight)/Pre-impregnation weight×100.

(4) Collection of Ultrahigh-Molecular-Weight Polyethylene Powder Having Particle Size of Smaller than 75 μm Each ultrahigh-molecular-weight polyethylene powder was classified through screen meshes having an aperture size of 710 μm, 500 μm, 425 μm, 355 μm, 300 μm, 212 μm, 150 μm, 106 μm, 75 μm, or 53 μm conforming to the specification of JIS Z 8801.

A powder having a particle size of smaller than 75 μm was separated from these fractions of the classified ultrahigh-molecular-weight polyethylene powder.

(5) Specific Pore Surface Area Measured by BET Method

Approximately 1 g of the ultrahigh-molecular-weight polyethylene powder having a particle size of smaller than 75 μm collected in (4) was placed in a glass tube, and heated and vacuum-deaerated under reduced pressure of approximately 100 mTorr at a temperature of 70° C. over approximately 18 hours. Then, an absorption isotherm at −196° C. was measured as to the ultrahigh-molecular-weight polyethylene powder having a particle size of smaller than 75 μm in a multi-sample high-performance specific surface area/pore distribution measurement apparatus (trade name: 3Flex, manufactured by Micromeritics Instrument Corp.) using a krypton gas as an adsorption gas. The specific pore surface area (particle size: smaller than 75 μm; specific pore surface area (m 2/g)) of the ultrahigh-molecular-weight polyethylene powder having a particle size of smaller than 75 μm was determined from a multipoint BET plot.

(6) Pore Volume and Pore Size Measured with Mercury Porosimeter

The pore volume (particle size: smaller than 75 μm; pore volume (mL/g)) and pore distribution of the ultrahigh-molecular-weight polyethylene powder having a particle size of smaller than 75 μm collected in (4) were measured using AutoPore IV9500 manufactured by Shimadzu Corp. as a mercury porosimeter. The average pore size (particle size: smaller than 75 μm; average pore size (μm)) of the ultrahigh-molecular-weight polyethylene powder having a particle size of smaller than 75 μm was calculated on the basis of the obtained pore distribution.

For pretreatment, 0.5 g of the ultrahigh-molecular-weight polyethylene powder having a particle size of smaller than 75 μm collected in (4) was placed in a sample cell and deaerated and dried at ordinary temperature in a low-pressure measuring section. Then, the sample container was filled with mercury. Pressure was gradually applied thereto (high-pressure section) so that mercury was injected into the pores of the sample.

The pressure conditions were set as follows.

Low-pressure section: Measurement at $N_2$ pressure of 69 Pa (0.01 psia)

High-pressure section: 21 to 228 MPa (3000 to 33000 psia)

(7) Degree of Crystallinity of Ultrahigh-Molecular-Weight Polyethylene Powder by X Ray Measurement The degree of crystallinity of each ultrahigh-molecular-weight polyethylene powder was measured by wide-angle X ray scattering (WAXS) under the following conditions.

Ultima-IV manufactured by Rigaku Corp. was used in measurement. Cu-Kα ray was allowed to enter the sample ultrahigh-molecular-weight polyethylene powder, and diffracted ray was detected with D/tex Uitra. The measurement conditions were conditions involving a distance of 285 mm between the sample and the detector, an excitation voltage of 40 kV, and a current of 40 mA. A focusing optical system was adopted as an optical system. Slit conditions involved DS=½°, SS=liberated, and longitudinal slit=10 mm.

(8) Proportion of Ultrahigh-Molecular-Weight Polyethylene Powder Particle Having Particle Size of Smaller than 75 μm The proportion of a particle having a particle size of smaller than 75 μm (proportion of a particle size of smaller than 75 μm) in all ultrahigh-molecular-weight polyethylene powder particles (hereinafter, also simply referred to as "particles") was determined as the weight of particles passing through a sieve having an aperture size of 75 μm based on the total weight of particles (ultrahigh-molecular-weight polyethylene powder) after classification of 100 g of the particles using 10 types of sieves (aperture size: 710 μm, 500 μm, 425 μm, 355 μm, 300 μm, 212 μm, 150 μm, 106 μm, 75 μm, and 53 μm) stipulated by JIS Z 8801.

The proportion (% by mass) of the particle having a particle size of smaller than 75 μm was calculated according to the following expression from the thus-determined weight of particles passing through a sieve having an aperture size of 75 μm.

Proportion of the particle having a particle size of smaller than 75 μm=[Weight (g) of particles passing through a sieve having an aperture size of 75 μm]/[Total weight 100 (g) of particles (ultrahigh-molecular-weight polyethylene powder)]×100

(9) Average Particle Size (D50) of Ultrahigh-Molecular-Weight Polyethylene Powder The average particle size of each polyethylene powder was defined as a particle size that reached 50% by weight in an integral curve in which the weights of particles remaining on respective sieves in the classification of 100 g of particles using 10 types of sieves (aperture size: 710 μm, 500 μm, 425 μm, 355 μm, 300 μm, 212 μm, 150 μm, 106 μm, 75 μm, and 53 μm) stipulated by JIS Z 8801 were integrated from the smaller aperture size.

(10) Ti and Al Contents in Ultrahigh-Molecular-Weight Polyethylene Powder

Each ultrahigh-molecular-weight polyethylene powder was pressure-decomposed using a microwave decomposition apparatus (model ETHOS TC, manufactured by Milestone General K.K.). The element concentrations of the metals Titanium (Ti) and aluminum (Al) contained in the ultrahigh-molecular-weight polyethylene powder were measured by the internal standard method using ICP-MS (inductively coupled plasma-mass spectrometer, model X Series X7, manufactured by ThermoFisher Scientific K.K.).

(11) Method for Producing Microporous Membrane for Secondary Battery Separator

A microporous membrane for a secondary battery separator was produced using each ultrahigh-molecular-weight polyethylene powder.

30 to 40 parts by mass of each ultrahigh-molecular-weight polyethylene powder, 60 to 70 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added based on 100 parts by mass in total of the ultrahigh-molecular-weight polyethylene powder and the liquid paraffin to prepare a liquid in a slurry form.

The obtained liquid in a slurry form was charged via a feeder into a twin screw extruder (unit model: 2D25S) for Labo Plastomill (unit model: 30C150) manufactured by Toyo Seiki Seisaku-sho, Ltd. in the nitrogen atmosphere after purging with nitrogen. The liquid was kneaded under conditions of 200° C. and then extruded from a T die placed at the tip of the extruder. Immediately thereafter, the extrudate was solidified by cooling on a cast roll cooled to 25° C. to form a sheet in a gel form.

This sheet in a gel form was drawn at 120° C. at a ratio of 7×7 using a simultaneous biaxial drawing machine. Then, this drawn film was dipped in methyl ethyl ketone or hexane for the extraction and removal of liquid paraffin, and then vacuum-dried for 24 hours or longer. The film was further heat-set at 125° C. for 3 minutes to obtain a microporous membrane for a secondary battery separator.

(12) Amount of Gum in Production of Microporous Membrane for Secondary Battery Separator Film formation operation was performed for 1 hour according to the method described in (11). In this operation, the amount of gum attached to the tip of an extruder was visually determined.
(Evaluation criteria)
◎ (good) . . . gum was absent.
○ (fair) . . . gum was present (in a small amount).
× (poor) . . . gum was present (in a large amount).

(13) Uneven Film Thickness of Microporous Membrane for Secondary Battery Separator A microporous membrane for a secondary battery separator was formed according to the method described in (11). The film thickness of the obtained microporous membrane was measured at room temperature (23° C.) using a micro thickness gauge (Type KBM®) manufactured by Toyo Seiki Seisaku-sho, Ltd. Ten arbitrary points were selected for measurement such that the points were evenly positioned per m of the membrane. A total of 50 points in 5 m of the membrane were measured, and an average film thickness was calculated. The average film thickness was 5 μm or larger and 20 μm or smaller. The uneven film thickness of the microporous membrane was evaluated on the basis of the average film thickness as follows.
(Evaluation criteria)
◎ represents being very good and means variations of less than ±3 μm from the average film thickness.
○ represents having no problem and means variations of ±3 μm or more and less than ±5 μm from the average film thickness.
× represents being poor and means variations of ±5 μm or more from the average film thickness.

(14) Puncture Strength of Microporous Membrane for Secondary Battery Separator

A sheet in a gel form obtained according to the method described in (11) was drawn at 120° C. at a ratio of 7×7 using a simultaneous biaxial drawing machine. The obtained drawn membrane was subjected to a puncture test under conditions involving a radius of curvature of 0.5 mm at the tip of a needle and a puncture rate of 2 mm/sec using "KES-G5 Handy Compression Tester" (TM) manufactured by Kato Tech Co., Ltd. to measure a maximum puncture load (N). A maximum puncture load (N) of 3.0 N or more represents sufficiently excellent strength. The evaluation criteria were as follows.
(Evaluation criteria)
◎ (good): a maximum puncture load (N) of 3.5 N or more
○ (fair): a maximum puncture load (N) of 3.0 N or more and less than 3.5 N
× (poor): a maximum puncture load (N) of less than 3.0 N

(15) The Number of Wrinkles in Microporous Membrane for Secondary Battery Separator The number of wrinkles in the microporous membrane obtained according to the method described in (11) was visually measured. The evaluation criteria were as follows.
(Evaluation criteria)
◎ (good): the number of wrinkles was 30 or less wrinkles/1000 m 2
○ (fair): the number of wrinkles was 31 or more and or less wrinkles/1000 m 2
× (poor): the number of wrinkles was 51 or more wrinkles/1000 m$^2$

(16) Method for Producing High-Strength Fiber

A high-strength fiber was produced using each ultrahigh-molecular-weight polyethylene powder as follows.

5 to 10 parts by mass of each ultrahigh-molecular-weight polyethylene powder, 90 to 95 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added based on 100 parts by mass in total of the ultrahigh-molecular-weight polyethylene powder and the liquid paraffin to prepare a liquid in a slurry form.

Next, the liquid in a slurry form was vacuum-deaerated with stirring at 80° C. or higher for 1 hour or longer and then introduced into an extruder. The liquid in a slurry form in the extruder was kneaded in the nitrogen atmosphere, and the oxygen concentration was set to 0.1% by volume or lower.

A twin screw extruder (unit model: 2D25S) for Labo Plastomill (unit model: 30C150) manufactured by Toyo Seiki Seisaku-sho, Ltd. was used as the extruder into which the liquid in a slurry form was introduced. Kneading and spinning operation was performed.

The temperature at which the liquid in a slurry form was kneaded in the extruder was 140° C. or higher and 320° C. or lower. The melt retention time within the extruder was 5 minutes or longer and 30 minutes or shorter.

Then, the liquid was spun through a spinneret attached to the tip of the extruder. The temperature of the spinneret was 140° C. or higher and 250° C. or lower. The discharge rate was 0.5 g/min or more and 2.0 g/min or less. The pore size of the spinneret was 0.3 mm or larger and 1.5 mm or smaller.

Next, the discharged thread containing the liquid paraffin was charged into a water bath of 5° C. or higher and 15° C. or lower via an air gap of 3 to 5 cm and wound while rapidly cooled. The winding rate was 20 m/min or more and 50 m/min or less.

Subsequently, the liquid paraffin was removed from the thread. The thread was dipped in a solvent such as hexane, followed by extraction operation and subsequent drying in vacuum for 24 hours or longer.

The obtained thread was brought into contact with a metal heater such that the temperature of the thread reached 100° C. or higher and 140° C. or lower. The thread was primarily drawn, and the drawn thread was wound. Subsequently, the drawn thread was brought into contact with a metal heater such that the temperature of the drawn thread reached 140° C. or higher and 160° C. or lower. The thread was further secondarily drawn. The thread was drawn immediately before being broken to obtain a drawn thread. The obtained drawn thread (high-strength fiber) was evaluated for the uniformity of its thread diameter, etc. as follows.

(17) Amount of Gum in Production of High-Strength Fiber

Spinning operation was performed for 1 hour according to the method described in (16). In this operation, the amount of gum attached near a spinneret was visually determined.
(Evaluation criteria)
 ⊚ (good) . . . gum was absent.
 ◯ (fair) . . . gum was present (in a small amount).
 x (poor) . . . gum was present (in a large amount).

(18) Uneven Thread Diameter of High-Strength Fiber

Ten threads (high-strength fiber) obtained by spinning and drawn to the breaking limit were provided according to the method described in (16), and an average thread diameter was calculated at n=10. The average thread diameter was 10 µm or larger and 20 µm or smaller. The uneven thread diameter of the high-strength fiber was evaluated on the basis of the average thread diameter as follows.
(Evaluation criteria)
 ⊚ represents being very good and means variations of less than ±5 µm from the average thread diameter.
 ◯ represents having no problem and means variations of ±5 µm or more and less than ±10 µm from the average thread diameter.
 x represents being poor and means variations of ±10 µm or more from the average thread diameter.

(19) Tensile Breaking Strength of High-Strength Fiber

Ten threads obtained by spinning were provided according to the method described in (16), and the tensile breaking strength was calculated at n=10. The method for calculating the tensile breaking strength was as described below.

The tensile breaking strength was calculated by pulling the thread drawn to the breaking limit, at room temperature until break, and dividing the highest load value thus applied to the thread by fineness. The fineness is a weight per $1\times10^4$ m of the thread, and its unit is dtex. The tensile breaking strength of the high-strength fiber was evaluated according to the following criteria.
(Evaluation criteria)
 ⊚ (good) . . . breaking strength of 30 cN/dtex or more
 ◯ (fair) . . . breaking strength of 20 cN/dtex or more and less than 30 cN/dtex
 x (poor) . . . breaking strength of less than 20 cN/dtex

[Method for synthesizing catalyst]
[Preparation of solid catalytic component [A]]
(1) Synthesis of starting material (a-1)

To an 8 L stainless autoclave thoroughly purged with nitrogen, 2,000 mL of a hexane solution containing 1 mol/L $Mg_6(C_4H_9)_{12}Al(C_2H_5)_3$ (corresponding to 2000 mmol in total of magnesium and aluminum) was added. To this autoclave, 240 mL of a hexane solution containing 8.33 mol/L methyl hydrogen polysiloxane (manufactured by Shin-Etsu Chemical Co., Ltd.) was pressure-fed with stirring at 80° C., and the stirring was further continued at 80° C. over 2 hours. After the completion of the reaction, the reaction solution was cooled to ordinary temperature and used as starting material (a-1). The starting material (a-1) had a concentration of 0.786 mol/L in total of magnesium and aluminum.

(2)

To an 8 L stainless autoclave purged with nitrogen, 1,600 mL of hexane was added. To this autoclave, 800 mL of a hexane solution containing 1 mol/L titanium tetrachloride and 800 mL of the starting material (a-1) were added at the same time over 5 hours with stirring at 10° C. The reaction was continued at 10° C. for 1 hour. After the completion of the reaction, the supernatant was removed from the obtained reaction solution, and the resulting solid was washed with hexane four times for removal of unreacted starting material components to prepare solid catalytic component [A].

[Preparation of solid catalytic component [B]]
(1) Synthesis of starting material (b-1)

To an 8 L stainless autoclave thoroughly purged with nitrogen, 2,000 mL of a hexane solution containing 1 mol/L $Mg_6(C_4H_9)_{12}Al(C_2H_5)_3$ (corresponding to 2000 mmol in total of magnesium and aluminum) was added. To this autoclave, 146 mL of a hexane solution containing 5.47 mol/L n-butanol was added dropwise over 3 hours with stirring at 50° C. After the completion of the dropwise addition, the line was washed with 300 mL of hexane. The stirring was further continued at 50° C. over 2 hours. After the completion of the reaction, the reaction solution was cooled to ordinary temperature and used as starting material (b-1). The starting material (b-1) had a concentration of 0.704 mol/L in total of magnesium and aluminum.

(2) Synthesis of starting material (b-2)

To an 8 L stainless autoclave thoroughly purged with nitrogen, 2,000 mL of a hexane solution containing 1 mol/L Mg$_6$(C$_4$H$_9$)$_{12}$Al(C$_2$H$_5$)$_3$ (corresponding to 2000 mmol in total of magnesium and aluminum) was added. To this autoclave, 240 mL of a hexane solution containing 8.33 mol/L methyl hydrogen polysiloxane (manufactured by Shin-Etsu Chemical Co., Ltd.) was pressure-fed with stirring at 80° C., and the stirring was further continued at 80° C. over 2 hours. After the completion of the reaction, the reaction solution was cooled to ordinary temperature and used as starting material (b-2). The starting material (b-1) had a concentration of 0.786 mol/L in total of magnesium and aluminum.

(3) Synthesis of carrier (B-1)

To an 8 L stainless autoclave thoroughly purged with nitrogen, 1,000 mL of a hexane solution containing 1 mol/L hydroxytrichlorosilane was added. To this autoclave, 1340 mL of a hexane solution of the organic magnesium compound as the starting material (b-1) (corresponding to 943 mmol of magnesium) was added dropwise at 65° C. over 3 hours, and the reaction was further continued with stirring at 65° C. for 1 hour. After the completion of the reaction, the supernatant was removed from the obtained reaction solution, and the resulting solid was washed with 1,800 mL of hexane four times to obtain carrier (B-1). As a result of analyzing this carrier, the amount of magnesium contained per g of the solid was 7.5 mmol.

(4)

To 1,970 mL of the hexane slurry containing 110 g of the carrier (B-1), 103 mL of a hexane solution containing 1 mol/L titanium tetrachloride and 131 mL of the starting material (b-2) were added at the same time over 3 hours with stirring at 10° C. After the addition, the reaction was continued at 10° C. for 1 hour. After the completion of the reaction, the supernatant was removed from the obtained reaction solution, and the resulting solid was washed with hexane four times for removal of unreacted starting material components to prepare solid catalytic component [B].

Example 1

(Polymerization step for polyethylene)

Hexane, ethylene, hydrogen, and a catalyst were continuously supplied to vessel-type 300 L polymerization reactor (1) equipped with a stirring apparatus. The polymerization pressure was 0.5 MPa. The polymerization temperature was kept at 83° C. by jacket cooling. The hexane was supplied at 40 L/hr from the bottom of the polymerization reactor (1). The catalyst used was the solid catalytic component [A], and a mixture of triisobutyl aluminum and diisobutyl aluminum hydride (9:1 mixture in terms of a mass ratio in this order) was used as a promoter. The solid catalytic component [A] was added from the intermediate portion between the surface of the solution in the polymerization reactor (1) and the bottom of the reactor at a rate of 0.2 g/hr, and the promoter was added from the intermediate portion between the surface of the solution in the polymerization reactor (1) and the bottom of the reactor at a rate of 10 mmol/hr. Polyethylene was produced at a rate of 14 kg/hr. The hydrogen was continuously supplied using a pump such that the hydrogen concentration based on ethylene in a gas phase was 11.0 mol %. The hydrogen was supplied to the gas phase, and the ethylene was supplied from the bottom of the polymerization reactor (1). The catalytic activity was 50,000 g-PE/g-solid catalytic component [A]. Next, the polymer slurry was continuously discharged into a flash drum having a pressure of 0.05 MPa and a temperature of 83° C. such that the level of the polymerization reactor was kept constant. Then, the polymer slurry was supplied to vessel-type 300 L polymerization reactor (2) having a pressure of 0.8 MPa and a temperature of 83° C. using a slurry pump to perform the second stage of polymerization, followed by the separation of unreacted ethylene and hydrogen. The catalytic activity was 70,000 g-PE/g-solid catalytic component [A]. The polymer slurry retention time at the first stage was 1 hour, and the polymer slurry retention time at the second stage was 4 hours.

Next, the polymer slurry was continuously sent to a centrifuge such that the level of the polymerization reactor was kept constant to separate the polyethylene powder from the other materials such as the solvent. In this operation, the content of the materials such as the solvent based on the polyethylene powder was 87% by mass.

The separated polyethylene powder was dried under nitrogen blow at three divided stages as follows: in the primary drying, the powder was dried at 115° C. for a time corresponding to ¼ of the total drying time. In this operation, the ultrahigh-molecular-weight polyethylene powder was impregnated by the spraying of a mixed solution of water:methanol=20:80 into a dryer to deactivate the catalyst and the promoter. In the intermediate drying, the powder was dried at 95° C. for a time corresponding to ²⁄₄ of the total drying time. In the latter drying, the powder was dried at 80° C. for a time corresponding to ¼ of the total drying time. The total drying time was set to 2 hours.

To the obtained ultrahigh-molecular-weight polyethylene powder, 500 ppm of calcium stearate (manufactured by Dainichi Chemical Industry Co., Ltd.) was added, and uniformly mixed using a Henschel mixer. The obtained ultrahigh-molecular-weight polyethylene powder was passed through a sieve having an aperture size of 425 μm such that particles that failed to pass through the sieve were removed to obtain an ultrahigh-molecular-weight polyethylene powder. The viscosity-average molecular weight of the obtained ultrahigh-molecular-weight polyethylene powder was 30×10$^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane for a secondary battery separator was produced according to the method described in (11) using the obtained ultrahigh-molecular-weight polyethylene powder added in an amount of 40 parts by mass and liquid paraffin added in an amount of 60 parts by mass based on 100 parts by mass in total of the ultrahigh-molecular-weight polyethylene powder and liquid paraffin. Results of evaluating the obtained microporous membrane are shown in Table 1.

Example 2

(Polymerization Step for Polyethylene)

An ultrahigh-molecular-weight polyethylene powder of Example 2 was obtained in the same way as in Example 1 except that 0.4 mol % of 1-butene based on ethylene was introduced from a gas phase. The viscosity-average molecular weight of the obtained ultrahigh-molecular-weight polyethylene powder was 30×10$^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane of Example 2 was obtained in the same way as in Example 1 except that the obtained ultrahigh-molecular-weight polyethylene powder was used.

Results of evaluating the obtained microporous membrane are shown in Table 1.

Example 3

(Polymerization Step for Polyethylene)

An ultrahigh-molecular-weight polyethylene powder of Example 3 was obtained in the same way as in Example 1 except that: the catalyst used was the solid catalytic component [B], and $Mg_6(C_4H_9)_{12}AL(C_2H_5)_3$ was used as a promoter; at the first stage of polymerization, the temperature was 70° C., and the pressure was 0.4 MPa; at the second stage of polymerization, the temperature was 70° C., and the pressure was 0.7 MPa; 0.25 mol % of 1-butene based on ethylene was introduced from a gas phase; and the hydrogen concentration based on ethylene in the gas phase was 0.20 mol %. The viscosity-average molecular weight of the obtained ultrahigh-molecular-weight polyethylene powder was $300 \times 10^4$. The properties of the obtained ultrahigh-molecular-weight polyethylene powder were measured by the methods described above. The measurement results are shown in Table 1.

(Method for producing high-strength fiber)

A high-strength fiber was produced according to the method described in (16) using the obtained ultrahigh-molecular-weight polyethylene powder added in an amount of 10 parts by mass and liquid paraffin added in an amount of 90 parts by mass based on 100 parts by mass in total of the ultrahigh-molecular-weight polyethylene powder and liquid paraffin under the conditions given below. Results of evaluating the obtained high-strength fiber are shown in Table 1.

(Conditions)
  Stirring temperature of liquid in slurry form: 80° C.
  Stirring time of liquid in slurry form: 1 hr
  Kneading temperature in extruder: 200° C.
  Melt retention time in extruder: 10 min
  Temperature of spinneret: 200° C.
  Discharge rate of thread from extruder: 0.5 g/min
  Pore size of spinneret: 1.0 mm
  Air gap: 4 cm
  Temperature in water bath for rapid cooling of thread: 5° C.
  Winding rate: 30 m/min
  Vacuum drying time: 24 hr
  Thread temperature upon contact metal heater in primary drawing: 120° C.
  Thread temperature upon contact metal heater in secondary drawing: 140° C.

Example 4

(Polymerization Step for Polyethylene)

An ultrahigh-molecular-weight polyethylene powder of Example 4 was obtained in the same way as in Example 1 except that: the catalyst used was the solid catalytic component [B], and $Mg_6(C_4H_9)_{12}AL(C_2H_5)_3$ was used as a promoter; at the first stage of polymerization, the temperature was 60° C., and the pressure was 0.4 MPa; at the second stage of polymerization, the temperature was and the pressure was 0.7 MPa; and the hydrogen concentration based on ethylene in the gas phase was 0.02 mol %. The viscosity-average molecular weight of the obtained ultrahigh-molecular-weight polyethylene powder was $660 \times 10^4$. The properties of the obtained ultrahigh-molecular-weight polyethylene powder were measured by the methods described above. The measurement results are shown in Table 1.

(Method for Producing High-Strength Fiber)

A high-strength fiber of Example 4 was obtained in the same way as in Example 3 except that the amounts of the obtained ultrahigh-molecular-weight polyethylene powder and liquid paraffin added were 5 parts by mass and parts by mass, respectively, based on 100 parts by mass in total of the ultrahigh-molecular-weight polyethylene powder and liquid paraffin. Results of evaluating the obtained high-strength fiber are shown in Table 1.

Example 5

(Polymerization Step for Polyethylene)

An ultrahigh-molecular-weight polyethylene powder of Example 5 was obtained in the same way as in Example 1 except that the polymer slurry retention times at the first and second stages were changed to 4 hours and 1 hour, respectively. The viscosity-average molecular weight of the obtained ultrahigh-molecular-weight polyethylene powder was $30 \times 10^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane of Example 5 was obtained in the same way as in Example 1 except that the obtained ultrahigh-molecular-weight polyethylene powder was used. Results of evaluating the obtained microporous membrane are shown in Table 1.

Example 6

(Polymerization Step for Polyethylene)

An ultrahigh-molecular-weight polyethylene powder of Example 6 was obtained in the same way as in Example 1 except that the pressure at the second stage of polymerization was changed to 0.5 MPa. The viscosity-average molecular weight of the obtained ultrahigh-molecular-weight polyethylene powder was $30 \times 10^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane of Example 6 was obtained in the same way as in Example 1 except that the obtained ultrahigh-molecular-weight polyethylene powder was used. Results of evaluating the obtained microporous membrane are shown in Table 1.

Example 7

(Polymerization Step for Polyethylene)

An ultrahigh-molecular-weight polyethylene powder of Example 7 was obtained in the same way as in Example 1 except that: the polymer slurry retention times at the first and second stages were changed to 4 hours and 1 hour, respectively; and the primary drying temperature was changed to 90° C. The viscosity-average molecular weight of the obtained ultrahigh-molecular-weight polyethylene powder was 30×10⁴. The properties of the obtained ultrahigh-molecular-weight polyethylene powder were measured by the methods described above. The measurement results are shown in Table 1.
(Method for Producing Microporous Membrane for Secondary Battery Separator)

A microporous membrane of Example 7 was obtained in the same way as in Example 1 except that the obtained ultrahigh-molecular-weight polyethylene powder was used. Results of evaluating the obtained microporous membrane are shown in Table 1.

Example 8

(Polymerization Step for Polyethylene)

An ultrahigh-molecular-weight polyethylene powder of Example 8 was obtained in the same way as in Example 1 except that the latter drying temperature was changed to 110° C. The viscosity-average molecular weight of the obtained ultrahigh-molecular-weight polyethylene powder was 30×10⁴. The properties of the obtained ultrahigh-molecular-weight polyethylene powder were measured by the methods described above. The measurement results are shown in Table 1.
(Method for Producing Microporous Membrane for Secondary Battery Separator)

A microporous membrane of Example 8 was obtained in the same way as in Example 1 except that the obtained ultrahigh-molecular-weight polyethylene powder was used. Results of evaluating the obtained microporous membrane are shown in Table 1.

Example 9

(Polymerization Step for Polyethylene)

An ultrahigh-molecular-weight polyethylene powder of Example 9 was obtained in the same way as in Example 1 except that: the catalyst used was the solid catalytic component [B], and $Mg_6(C_4H_9)_{12}AL(C_2H_5)_3$ was used as a promoter; at the first stage of polymerization, the temperature was 70° C., and the pressure was 0.4 MPa; at the second stage of polymerization, the temperature was 70° C., and the pressure was 0.7 MPa; and the hydrogen concentration based on ethylene in the gas phase was 0.20 mol %. The viscosity-average molecular weight of the obtained ultrahigh-molecular-weight polyethylene powder was 300×10⁴. The properties of the obtained ultrahigh-molecular-weight polyethylene powder were measured by the methods described above. The measurement results are shown in Table 1.
(Method for Producing High-Strength Fiber)

A high-strength fiber was produced in the same way as in Example 3 except that the obtained ultrahigh-molecular-weight polyethylene powder was used. Results of evaluating the obtained high-strength fiber are shown in Table 1.

Comparative Example 1

(Polymerization Step for Polyethylene)

An ultrahigh-molecular-weight polyethylene powder of Comparative Example 1 (solidified by fusion) was obtained in the same way as in Example 1 except that: at the first and second stages of polymerization, the temperature was 85° C.; and the hydrogen concentration based on ethylene in the gas phase was 30.0 mol %. The viscosity-average molecular weight of the obtained ultrahigh-molecular-weight polyethylene powder was 3×10⁴. Since the obtained ultrahigh-molecular-weight polyethylene powder was solidified by fusion, its properties were not measured.
(Method for Producing Microporous Membrane for Secondary Battery Separator)

Although a membrane was formed in the same way as in Example 1 using the obtained ultrahigh-molecular-weight polyethylene powder, no microporous membrane was able to be obtained.

Comparative Example 2

(Polymerization Step for Polyethylene)

An ultrahigh-molecular-weight polyethylene powder of Comparative Example 2 was obtained in the same way as in Example 1 except that: the catalyst used was the solid catalytic component [B], and $Mg_6(C_4H_9)_{12}AL(C_2H_5)_3$ was used as a promoter; at the first stage of polymerization, the temperature was 50° C., and the pressure was 0.3 MPa; at the second stage of polymerization, the temperature was and the pressure was 0.6 MPa; and the hydrogen concentration based on ethylene in the gas phase was mol %. The viscosity-average molecular weight of the obtained ultrahigh-molecular-weight polyethylene powder was 1200×10⁴. The properties of the obtained ultrahigh-molecular-weight polyethylene powder were measured by the methods described above. The measurement results are shown in Table 1.
(Method for Producing Microporous Membrane for Secondary Battery Separator)

A microporous membrane of Comparative Example 2 was obtained in the same way as in Example 1 except that the obtained ultrahigh-molecular-weight polyethylene powder was used. Results of evaluating the obtained microporous membrane are shown in Table 1.

Comparative Example 3

(Polymerization Step for Polyethylene)

Hexane, ethylene, hydrogen, and a catalyst were continuously supplied to vessel-type 300 L polymerization reactor (1) equipped with a stirring apparatus. The polymerization pressure was 0.5 MPa. The polymerization temperature was kept at 83° C. by jacket cooling. The hexane was supplied at 40 L/hr from the bottom of the polymerization reactor (1). The catalyst used was the solid catalytic component [A], and a mixture of triisobutyl aluminum and diisobutyl aluminum hydride (9:1 mixture in terms of a mass ratio in this order) was used as a promoter. The solid catalytic component [A] was added from the intermediate portion between the surface of the solution in the polymerization reactor (1) and the bottom of the reactor at a rate of 0.2 g/hr, and the promoter was added from the intermediate portion between the surface of the solution in the polymerization reactor (1) and the bottom of the reactor at a rate of 10 mmol/hr. Polyethylene was produced at a rate of 14 kg/hr. The hydrogen was continuously supplied using a pump such that the hydrogen concentration based on ethylene in a gas phase was 11.0 mol %. The hydrogen was supplied to the gas phase, and the ethylene was supplied from the bottom of the polymerization reactor (1). The catalytic activity was 50,000 g-PE/g-solid catalytic component [A]. Next, the polymer slurry was continuously discharged into a flash drum having a pressure of 0.05 MPa and a temperature of 83° C. such that the level of the polymerization reactor was kept constant. Then, the polymer slurry was supplied to vessel-type 300 L polymerization reactor (2) having a pressure of 0.5 MPa and a temperature of 83° C. using a slurry pump to perform the second stage of polymerization, followed by the separation of unreacted ethylene and hydrogen. The catalytic activity was 50,000 g-PE/g-solid catalytic component [A]. The polymer slurry retention time at the first stage was 1 hour, and the polymer slurry retention time at the second stage was 4 hours.

Next, the polymer slurry was continuously sent to a centrifuge such that the level of the polymerization reactor was kept constant to separate the polyethylene powder from the other materials such as the solvent. In this operation, the content of the materials such as the solvent based on the polyethylene powder was 87% by mass.

The separated polyethylene powder was dried under nitrogen blow at three divided stages as follows: in the primary drying, the powder was dried at 90° C. for a time corresponding to ¼ of the total drying time. In this operation, the catalyst and the promoter were deactivated by the spraying of water into a dryer. In the intermediate drying, the powder was dried at 100° C. for a time corresponding to ¼ of the total drying time. In the latter drying, the powder was dried at 110° C. for a time corresponding to ²⁄₄ of the total drying time. The total drying time was set to 2 hours.

To the obtained ultrahigh-molecular-weight polyethylene powder, 500 ppm of calcium stearate (manufactured by Dainichi Chemical Industry Co., Ltd.) was added, and uniformly mixed using a Henschel mixer. The obtained ultrahigh-molecular-weight polyethylene powder was passed through a sieve having an aperture size of 425 μm such that particles that failed to pass through the sieve were removed to obtain an ultrahigh-molecular-weight polyethylene powder. The viscosity-average molecular weight of the obtained ultrahigh-molecular-weight polyethylene powder was $30\times10^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane of Comparative Example 3 was obtained in the same way as in Example 1 except that the obtained ultrahigh-molecular-weight polyethylene powder was used. Results of evaluating the obtained microporous membrane are shown in Table 1.

Comparative Example 4

(Polymerization Step for Polyethylene)

Hexane, ethylene, hydrogen, and a catalyst were continuously supplied to vessel-type 300 L polymerization reactor (1) equipped with a stirring apparatus. The polymerization pressure was 0.5 MPa. The polymerization temperature was kept at 83° C. by jacket cooling. The hexane was supplied at 40 L/hr from the bottom of the polymerization reactor (1). The catalyst used was the solid catalytic component [A], and a mixture of triisobutyl aluminum and diisobutyl aluminum hydride (9:1 mixture in terms of a mass ratio in this order) was used as a promoter. The solid catalytic component [A] was added from the intermediate portion between the surface of the solution in the polymerization reactor (1) and the bottom of the reactor at a rate of 0.2 g/hr, and the promoter was added from the intermediate portion between the surface of the solution in the polymerization reactor (1) and the bottom of the reactor at a rate of 10 mmol/hr. Polyethylene was produced at a rate of 14 kg/hr. The hydrogen was continuously supplied using a pump such that the hydrogen concentration based on ethylene in a gas phase was 11.0 mol %. The hydrogen was supplied to the gas phase, and the ethylene was supplied from the bottom of the polymerization reactor (1). The catalytic activity was 50,000 g-PE/g-solid catalytic component [A]. Next, the polymer slurry was continuously discharged into a flash drum having a pressure of 0.05 MPa and a temperature of 83° C. such that the level of the polymerization reactor was kept constant, followed by the separation of unreacted ethylene and hydrogen.

Next, the polymer slurry was continuously sent to a centrifuge such that the level of the polymerization reactor was kept constant to separate the polyethylene powder from the other materials such as the solvent. In this operation, the content of the materials such as the solvent based on the polyethylene powder was 87% by mass.

The separated polyethylene powder was dried under nitrogen blow at three divided stages as follows: in the primary drying, the powder was dried at 90° C. for a time corresponding to ¼ of the total drying time. In this operation, the catalyst and the promoter were deactivated by the spraying of water into a dryer. In the intermediate drying, the powder was dried at 100° C. for a time corresponding to ¼ of the total drying time. In the latter drying, the powder was dried at 120° C. for a time corresponding to ²⁄₄ of the total drying time. The total drying time was set to 2 hours. To the obtained ultrahigh-molecular-weight polyethylene powder, 500 ppm of calcium stearate (manufactured by Dainichi Chemical Industry Co., Ltd.) was added, and uniformly mixed using a Henschel mixer. The obtained ultrahigh-molecular-weight polyethylene powder was passed through a sieve having an aperture size of 425 μm such that particles that failed to pass through the sieve were removed to obtain an ultrahigh-molecular-weight polyethylene powder. The viscosity-average molecular weight of the obtained ultrahigh-molecular-weight polyethylene powder was $30\times10^4$. The properties of the obtained ultrahigh-molecular-weight polyethylene powder were measured by the methods described above. The measurement results are shown in Table 1.

(Method for Producing Microporous Membrane for Secondary Battery Separator)

A microporous membrane of Comparative Example 4 was obtained in the same way as in Example 1 except that the obtained ultrahigh-molecular-weight polyethylene powder was used. Results of evaluating the obtained microporous membrane are shown in Table 1.

TABLE 1

|  |  | Example 1 | Example 2 | Example 3 | Example 4 | Example 5 | Example 6 | Example 7 | Example 8 |
|---|---|---|---|---|---|---|---|---|---|
| Viscosity-average molecular weight (Mv) | ten thousand | 30 | 30 | 300 | 660 | 30 | 30 | 30 | 30 |
| Difference between swelling onset temperature and dissolution onset temperature | ° C. | 17 | 13 | 10 | 7 | 4.5 | 4 | 3.5 | 3.5 |

TABLE 1-continued

| | | | | | | | | | |
|---|---|---|---|---|---|---|---|---|---|
| Rate of impregnation with LP | % | 3.5 | 4.5 | 4 | 3.5 | 1.5 | 1 | 0.5 | 0.9 |
| Particle size of smaller than 75 μm; Specific pore surface area | m²/g | 0.3 | 0.2 | 1.2 | 0.4 | 0.15 | 0.15 | 0.08 | 0.2 |
| Particle size of smaller than 75 μm; Pore volume | mL/g | 0.7 | 0.5 | 0.9 | 0.9 | 0.2 | 0.2 | 0.2 | 0.4 |
| Particle size of smaller than 75 μm; Average pore size | μm | 0.4 | 0.2 | 0.3 | 0.3 | 0.1 | 0.1 | 0.5 | 0.08 |
| Degree of crystallinity | % | 72 | 71 | 71 | 75 | 72 | 73 | 74 | 68 |
| Proportion of particle size of smaller than 75 μm | % by mass | 4 | 6 | 12 | 30 | 4 | 4 | 5 | 7 |
| D50 | μm | 98 | 92 | 100 | 65 | 98 | 99 | 96 | 97 |
| Titanium content | ppm | 1.2 | 1.0 | 1.4 | 3.5 | 1.2 | 1.2 | 1.0 | 1.1 |
| Aluminum content | ppm | 2.5 | 3.0 | 2.0 | 0.5 | 2.6 | 2.6 | 3.0 | 2.5 |
| Amount of gum | — | ◎ | ◎ | ◎ | ◎ | ○ | ○ | ○ | ○ |
| Uneven film thickness/uneven thread diameter | — | ◎ | ◎ | ◎ | ◎ | ○ | ○ | ○ | ○ |
| Membrane puncture strength/thread tensile breaking strength | — | ◎ | ◎ | ◎ | ◎ | ◎ | ◎ | ○ | ◎ |
| The number of wrinkles | — | ◎ | ◎ | — | — | ◎ | ◎ | ○ | ◎ |

| | | Example 9 | Comparative Example 1 | Comparative Example 2 | Comparative Example 3 | Comparative Example 4 |
|---|---|---|---|---|---|---|
| Viscosity-average molecular weight (Mv) | ten thousand | 300 | 3 | 1200 | 30 | 30 |
| Difference between swelling onset temperature and dissolution onset temperature | ° C. | 25 | — | Solidified by fusion | 2 | 2.5 | 1 |
| Rate of impregnation with LP | % | 5 | — | | 3 | 0.4 | 0.2 |
| Particle size of smaller than 75 μm; Specific pore surface area | m²/g | 1.4 | — | | 0.4 | 0.1 | 0.05 |
| Particle size of smaller than 75 μm; Pore volume | mL/g | 1.7 | — | | 0.9 | 0.3 | 0.2 |
| Particle size of smaller than 75 μm; Average pore size | μm | 0.8 | — | | 0.3 | 0.1 | 0.05 |
| Degree of crystallinity | % | 80 | — | | 76 | 70 | 68 |
| Proportion of particle size of smaller than 75 μm | % by mass | 5 | — | | 36 | 5 | 5 |
| D50 | μm | 130 | — | | 59 | 98 | 97 |
| Titanium content | ppm | 4.5 | — | | 5.5 | 1.5 | 1.4 |
| Aluminum content | ppm | 5 | — | | 0.2 | 2.5 | 2.7 |
| Amount of gum | — | ◎ | — | | X | X | X |
| Uneven film thickness/uneven thread diameter | — | ◎ | — | | X | X | X |
| Membrane puncture strength/thread tensile breaking strength | — | ◎ | — | | X | ○ | X |
| The number of wrinkles | — | — | — | — | — | ○ | X |

The present application is based on Japanese Patent Application No. 2020-051302 filed on Mar. 23, 2020, the contents of which are incorporated herein by reference.

INDUSTRIAL APPLICABILITY

The ultrahigh-molecular-weight polyethylene powder of the present invention can produce a homogeneous gel excellent in solubility in a solvent, and can also produce a polyethylene powder excellent in processability because air bubbles are easily removed from the powder. As a result, the ultrahigh-molecular-weight polyethylene powder of the present invention can provide, for example, a molded article, a drawn molded article, a microporous membrane, and a fiber excellent in homogeneity, and thus has industrial applicability.

The invention claimed is:

1. An ultrahigh-molecular-weight polyethylene powder having a viscosity-average molecular weight (Mv) of $10 \times 10^4$ or higher and $1000 \times 10^4$ or lower,
having a difference of 3° C. or more between a swelling onset temperature and a dissolution onset temperature determined by the following method, and
having a rate of impregnation with liquid paraffin (rate of increase in weight) of 0.5% or more and 5.0% or less determined by the following method:

[method for measuring swelling onset temperature and dissolution onset temperature]

any one particle is collected while an ultrahigh-molecular-weight polyethylene powder having a major axis size and a minor axis size of 120 μm or larger and 130 μm or smaller is confirmed under an optical microscope; the collected one particle of the ultrahigh-molecular-weight polyethylene powder (hereinafter, also referred to as a "measurement particle") is loaded onto a glass cover, and one drop of liquid paraffin is added to the measurement particle using a 2 ml dropper; then, another glass cover is placed thereon so as to sandwich the measurement particle; then, the glass covers with the measurement particle sandwiched therebetween are placed on a heat stage, and a process of heating the measurement particle from room temperature to 150° C. under heating conditions given below is observed under an optical microscope equipped with a camera; in the heating step, observation images of the measurement particle are taken every 6 seconds; after the completion of measurement, an equivalent circle diameter of the measurement particle is calculated from each observation image using image analysis software, and the swelling onset temperature and the dissolution onset temperature are determined as described below:
(heating conditions)
heating rate from room temperature to 35° C.: 5° C./min;
heating rate in a range from 35° C. to 80° C.: 8° C./min; and
heating rate in a range from 80° C. to 150° C.: 5° C./min;
[swelling onset temperature]
the equivalent circle diameter of the measurement particle is calculated from the observation image of the photographed measurement particle using image analysis software; the lowest temperature at which the equivalent circle diameter of the measurement particle is increased by 1% or more based on the equivalent circle diameter of the measurement particle at 80° C. in a temperature range of 80° C. or higher and 150° C. or lower is regarded as the swelling onset temperature; a mean from three such measurements is used as the final swelling onset temperature;
[dissolution onset temperature]
the equivalent circle diameter of the measurement particle is calculated from the observation image of the photographed measurement particle using image analysis software; the measurement temperature at which the equivalent circle diameter of the measurement particle exhibits the largest value is regarded as the dissolution onset temperature; a mean from three such measurements is used as the final dissolution onset temperature;
[method for calculating rate of impregnation with liquid paraffin (rate of increase in weight)]
10 g of the ultrahigh-molecular-weight polyethylene powder is mixed with 30 g of liquid paraffin to prepare a sample; the prepared sample is placed in a metal container, which is then covered with aluminum foil and left at 70° C. for 3 hours; next, the sample is dried under reduced pressure at 110° C./reduced pressure (−0.1 MPa G) for 5 hours; then, the sample is subjected three times to washing filtration operation using 10 g of hexane and then dried in air for 24 hours or longer, followed by the weight measurement of the ultrahigh-molecular-weight polyethylene powder; the rate of impregnation with liquid paraffin (LP) (rate of increase in weight) is calculated from the rate of increase in the weight of the ultrahigh-molecular-weight polyethylene powder impregnated with liquid paraffin (post-impregnation weight) from the original weight of the ultra-high-molecular-weight polyethylene powder (pre-impregnation weight) according to the following expression:

Rate of impregnation with liquid paraffin (%)=(Post-impregnation weight−Pre-impregnation weight)/Pre-impregnation weight×100.

2. The ultrahigh-molecular-weight polyethylene powder according to claim 1, wherein a specific pore surface area is 0.10 m$^2$/g or larger and 1.50 m$^2$/g or smaller when an ultrahigh-molecular-weight polyethylene powder having a particle size of smaller than 75 μm is measured by a BET method based on krypton adsorption.

3. The ultrahigh-molecular-weight polyethylene powder according to claim 1, wherein a pore volume is 0.30 mL/g or larger and 1.70 mL/g or smaller when an ultrahigh-molecular-weight polyethylene powder having a particle size of smaller than 75 μm is measured with a mercury porosimeter.

4. The ultrahigh-molecular-weight polyethylene powder according to claim 1, wherein an average pore size is 0.10 μm or larger and 0.80 μm or smaller when an ultrahigh-molecular-weight polyethylene powder having a particle size of smaller than 75 μm is measured with a mercury porosimeter.

5. The ultrahigh-molecular-weight polyethylene powder according to claim 1, wherein a degree of crystallinity is 70% or more and less than 82%.

6. The ultrahigh-molecular-weight polyethylene powder according to claim 1, wherein the proportion of an ultrahigh-molecular-weight polyethylene powder having a particle size of smaller than 75 μm is 35% by mass or less per 100% by mass in total of the ultrahigh-molecular-weight polyethylene powder.

7. The ultrahigh-molecular-weight polyethylene powder according to claim 1, wherein an average particle size (D50) is 60 μm or larger and 140 μm or smaller.

8. The ultrahigh-molecular-weight polyethylene powder according to claim 1, wherein a titanium content is 0.1 ppm or higher and 5 ppm or lower.

9. The ultrahigh-molecular-weight polyethylene powder according to claim 1, wherein an aluminum content is 0.1 ppm or higher and 5 ppm or lower.

10. A molded article obtained by molding the ultrahigh-molecular-weight polyethylene powder according to claim 1.

11. The molded article according to claim 10, wherein the molded article is a microporous membrane, a high-strength fiber or a sintered body.

12. The ultrahigh-molecular-weight polyethylene powder according to claim 2, wherein a pore volume is 0.30 mL/g or larger and 1.70 mL/g or smaller when an ultrahigh-molecular-weight polyethylene powder having a particle size of smaller than 75 μm is measured with a mercury porosimeter.

13. The ultrahigh-molecular-weight polyethylene powder according to claim 2, wherein an average pore size is 0.10 μm or larger and 0.80 μm or smaller when an ultrahigh-molecular-weight polyethylene powder having a particle size of smaller than 75 μm is measured with a mercury porosimeter.

14. The ultrahigh-molecular-weight polyethylene powder according to claim 3, wherein an average pore size is 0.10 μm or larger and 0.80 μm or smaller when an ultrahigh-molecular-weight polyethylene powder having a particle size of smaller than 75 μm is measured with a mercury porosimeter.

15. The ultrahigh-molecular-weight polyethylene powder according to claim 12, wherein an average pore size is 0.10 μm or larger and 0.80 μm or smaller when an ultrahigh-molecular-weight polyethylene powder having a particle size of smaller than 75 μm is measured with a mercury porosimeter.

16. The ultrahigh-molecular-weight polyethylene powder according to claim 2, wherein a degree of crystallinity is 70% or more and less than 82%.

17. The ultrahigh-molecular-weight polyethylene powder according to claim 3, wherein a degree of crystallinity is 70% or more and less than 82%.

18. The ultrahigh-molecular-weight polyethylene powder according to claim 4, wherein a degree of crystallinity is 70% or more and less than 82%.

19. The ultrahigh-molecular-weight polyethylene powder according to claim 12, wherein a degree of crystallinity is 70% or more and less than 82%.

20. The ultrahigh-molecular-weight polyethylene powder according to claim 1, wherein the difference between the swelling onset temperature and the dissolution onset temperature of the ultrahigh-molecular-weight polyethylene powder of the present embodiment is 50° C. or less.

* * * * *